US012719939B1

(12) United States Patent
Oliver et al.

(10) Patent No.: US 12,719,939 B1
(45) Date of Patent: Aug. 25, 2026

(54) MEDIA SESSION ORCHESTRATOR

(71) Applicant: Amazon Technologies, Inc., Seattle, WA (US)

(72) Inventors: Brian Oliver, Seattle, WA (US); Christopher Ayoup, North York (CA); Neil Barakat, Brampton (CA); Derek Fosbury, Oakville (CA); Mark Andrew Gere, Toronto (CA); Samuel Scott Gigliotti, Seatte, WA (US); Roberto Gino Rasile, Toronto (CA); Norman Townsend, Toronto (CA); Guilherme Trein, Toronto (CA); Xiang Wu, Soutffville (CA)

(73) Assignee: Amazon Technologes, Inc., Seattle, WA (US)

( * ) Notice: Subject to any disclaimer, the term of this patent is extended or adjusted under 35 U.S.C. 154(b) by 920 days.

(21) Appl. No.: 16/455,588

(22) Filed: Jun. 27, 2019

(51) Int. Cl.

| | |
|---|---|
| ***H04L 65/1069*** | (2022.01) |
| ***H04L 65/1089*** | (2022.01) |
| ***H04L 65/1101*** | (2022.01) |
| ***H04M 7/00*** | (2006.01) |
| ***H04N 7/14*** | (2006.01) |

(Continued)

(52) U.S. Cl.

CPC ...... *H04L 65/1069* (2013.01); *H04L 65/1089* (2013.01); *H04L 65/1101* (2022.05); *H04M 7/0075* (2013.01); *H04N 7/147* (2013.01); *H04N 21/23* (2013.01); *H04N 21/2343* (2013.01); *H04N 21/236* (2013.01); *H04N 21/23614* (2013.01); *H04N 21/2665* (2013.01); *H04N 21/458* (2013.01);

(Continued)

(58) Field of Classification Search

CPC . G10L 15/26; H04L 65/1006; H04L 65/1069; H04L 51/10; H04L 65/1089; H04L 65/1101; H04L 65/1108; H04N 7/147; H04N 21/23; H04N 21/2343; H04N 21/236; H04N 21/23614; H04N 21/2665; H04N 21/458; H04N 21/631; H04N 21/478; H04M 7/0075; H04M 7/128

See application file for complete search history.

(56) References Cited

U.S. PATENT DOCUMENTS 9,100,539 B2 * 8/2015 Sanso ................. H04L 12/1827
10,887,646 B2 * 1/2021 Zane .................. H04N 21/2187

(Continued)

*Primary Examiner* — Gregory Todd
(74) *Attorney, Agent, or Firm* — Pierce Atwood LLP

(57) ABSTRACT

Techniques for media processing are described. A system may initiate and manage a communication session between two or more devices using a media session orchestrator (MESO). The MESO interacts with components associated with media processing services, media routing services, and signaling edge services, enabling devices from one or more networks to send and receive data. During the communication session, the system may perform media processing on data being sent between devices in order to provide additional functionality. For example, video content may be processed to provide subtitles in a plurality of languages, filters may be applied to change color balance or perform colorization of black and white content, or the like. The MESO architecture comprises a plurality of MESO routers and MESO executors, with the MESO routers being configured to route triggers and events associated with a specific media session to a single MESO executor that processes the media session.

20 Claims, 24 Drawing Sheets

(51) Int. Cl.

| | |
|---|---|
| ***H04N 21/23*** | (2011.01) |
| ***H04N 21/2343*** | (2011.01) |
| ***H04N 21/236*** | (2011.01) |
| ***H04N 21/2665*** | (2011.01) |
| ***H04N 21/458*** | (2011.01) |
| ***H04N 21/478*** | (2011.01) |
| ***H04N 21/63*** | (2011.01) |
| *H04L 65/1104* | (2022.01) |
| *H04M 3/56* | (2006.01) |

(52) U.S. Cl.

CPC ......... *H04N 21/478* (2013.01); *H04N 21/631* (2013.01); *H04L 65/1104* (2022.05); *H04M 3/568* (2013.01)

(56) References Cited

U.S. PATENT DOCUMENTS

| | | | | |
|---|---|---|---|---|
| 2016/0358629 | A1* | 12/2016 | Pribula | H04N 5/772 |
| 2017/0054764 | A1* | 2/2017 | Sharma | H04L 65/1026 |
| 2017/0332035 | A1* | 11/2017 | Shah | H04N 21/2393 |
| 2018/0054506 | A1* | 2/2018 | Hart | H04M 1/271 |
| 2020/0153963 | A1* | 5/2020 | Tichauer | H04M 3/4936 |
| 2021/0314632 | A1* | 10/2021 | De Decker | H04N 21/2187 |
| 2022/0329882 | A1* | 10/2022 | Sze | H04N 21/2343 |

* cited by examiner

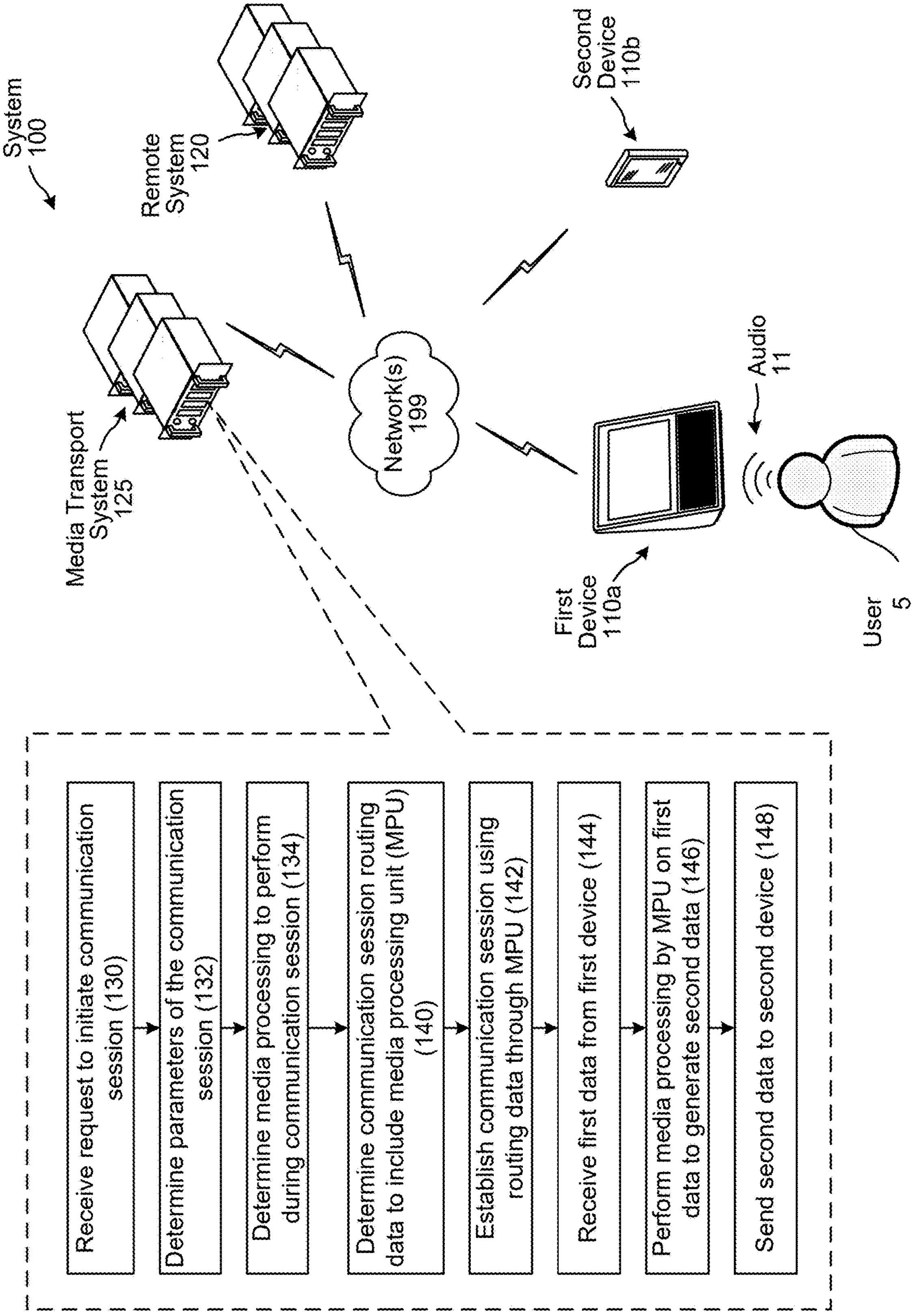

FIG. 1A
Receive request to initiate communication session (130)
Determine parameters of the communication session (132)
Determine media processing to perform during communication session (134)
Determine communication session routing data to include media processing unit (MPU) (140)
Establish communication session using routing data through MPU (142)
Receive first data from first device (144)
Perform media processing by MPU on first data to generate second data (146)
Send second data to second device (148)
System 100
Media Transport System 125
Remote System 120
Network(s) 199
First Device 110a
Second Device 110b
Audio 11
User 5

Wakeword Detection Component
220
Audio 11
Device 110
Audio Data 211
Remote System 120
Media Transport System 125
User Recognition 295
Communications Skill 290a
ASR 250
NLU 260
Orchestrator 230
Skill 290
TTS 280
Profile Storage 270a

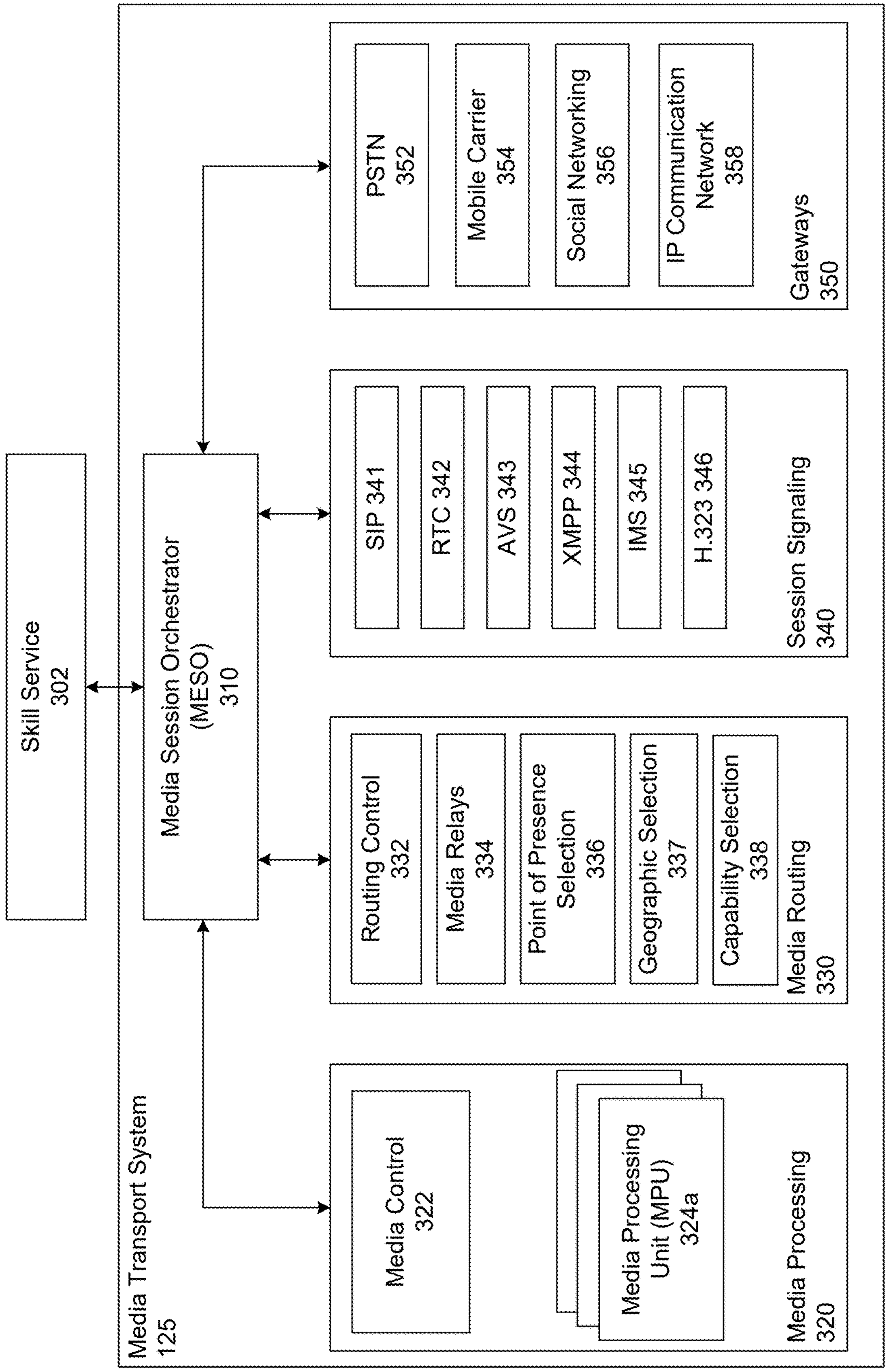

FIG. 3A
Skill Service
302
Media Transport System
125
Media Session Orchestrator
(MESO)
310
Media Control
322
Media Processing
Unit (MPU)
324a
Media Processing
320
Routing Control
332
Media Relays
334
Point of Presence
Selection
336
Geographic Selection
337
Capability Selection
338
Media Routing
330
SIP 341
RTC 342
AVS 343
XMPP 344
IMS 345
H.323 346
Session Signaling
340
PSTN
352
Mobile Carrier
354
Social Networking
356
IP Communication
Network
358
Gateways
350

Media Transport System
125
Media Session Orchestrator
(MESO)
310
MTS API
360
MTS API
Gateway
362
MTS
Event
Bus
364
Skill
Service
302
Media Processing
320
Media Control
322
Media Processing Units
(MPU) 324
MPU Pipeline Instance
326
Skill MPU
Application
328
Media Routing
330
Routing Control
332
Media Relays
334
Session
Signaling
340
Gateways
350
Devices
110

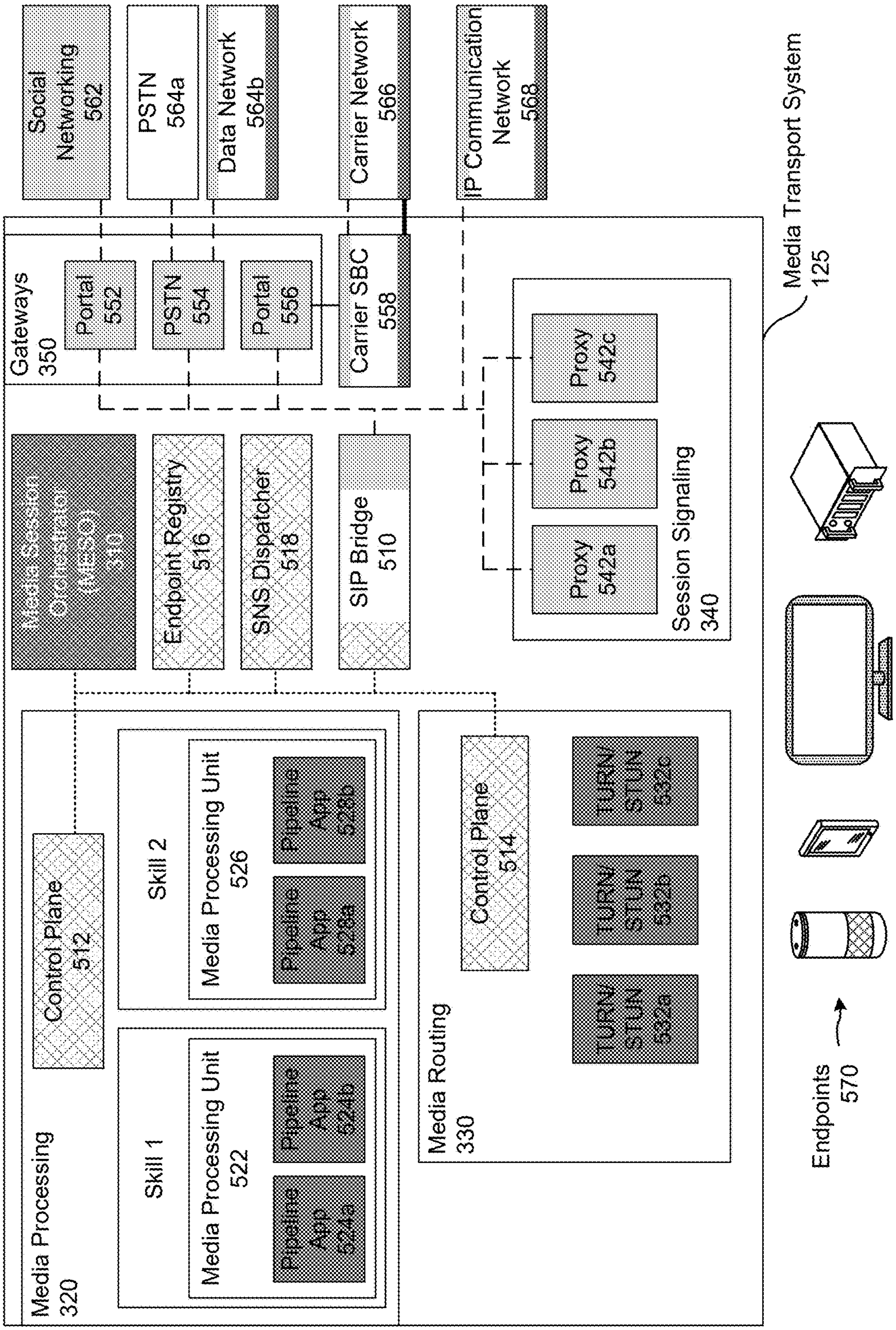

FIG. 5

Social Networking 562
PSTN 564a
Data Network 564b
Carrier Network 566
IP Communication Network 568

Gateways 350
Portal 552
PSTN 554
Portal 556
Carrier SBC 558

Media Session Orchestrator (MESO) 310
Endpoint Registry 516
SNS Dispatcher 518
SIP Bridge 510

Session Signaling 340
Proxy 542a
Proxy 542b
Proxy 542c

Media Processing 320
Control Plane 512
Skill 1
Media Processing Unit 522
Pipeline App 524a
Pipeline App 524b
Skill 2
Media Processing Unit 526
Pipeline App 528a
Pipeline App 528b Media Routing 330
Control Plane 514
TURN/STUN 532a
TURN/STUN 532b
TURN/STUN 532c Media Transport System 125

Endpoints 570

Media Transport
System
125
Skill Service
302
Control Plane
512
Skill 1
Media Processing Unit
522
Pipeline
App
524a
Media Processing
320
Media Routing
330
Control Plane
514
TURN/
STUN
532a
TURN/
STUN
532b
MTS API
610
Media Session
Orchestrator
(MESO)
310
Endpoint Registry
516
SIP Bridge
510
Gateways
350
PSTN
554
Data Network
564
4
Endpoint
570b
Session Signaling
340
Proxy
542a
Proxy
542b
Proxy
542c
Endpoint
570a
6
5

Media Transport System
125
Skill Service
302
4
Control Plane
512
5
MTS API
610
Gateways
350
Skill 1
Media Processing Unit
522
Pipeline App
524a
Media Session Orchestrator (MESO)
310
PSTN
554
Data Network
564
6
Endpoint Registry
516
7
3
SIP Bridge
510
Media Processing
320
Endpoint
570b
Media Routing
330
8
2
Control Plane
514
Session Signaling
340
Endpoint
570a
TURN/ STUN
532a
TURN/ STUN
532b
Proxy
542a
Proxy
542b
Proxy
542c
1

Media Transport
System
125
Skill Service
302
Control Plane
512
Skill 1
Media Processing Unit
522
Pipeline
App
524a
3
Media Processing
320
MTS API
610
Media Session
Orchestrator
(MESO)
310
Endpoint Registry
516
SIP Bridge
510
Gateways
350
PSTN
554
Data Network
564
5
Endpoint
570b
Media Routing
330
Control Plane
514
Endpoint
570a
2
TURN/
STUN
532a
TURN/
STUN
532b
Session Signaling
340
Proxy
542a
Proxy
542b
Proxy
542c
1
4

Media Transport
System
125
Skill Service
302
3
MTS API
610
Gateways
350
Control Plane
512
4
5
Skill 1
Media Processing Unit
522
Pipeline
App
524a
Media Session
Orchestrator
(MESO)
310
PSTN
554
Data Network
564
Media
Storage
810
Endpoint Registry
516
1
SIP Bridge
510
2
Media Processing
320
Endpoint
570
Media Routing
330
6
Control Plane
514
Session Signaling
340
TURN/
STUN
532a
TURN/
STUN
532b
Proxy
542a
Proxy
542b
Proxy
542c Media Transport System 125
Skill Service 302
Control Plane 512
Skill 1
Media Processing Unit 522
Pipeline App 524a
Media Processing 320
Media Storage 810
MTS API 610
Media Session Orchestrator (MESO) 310
Endpoint Registry 516
SIP Bridge 510
Gateways 350
PSTN 554
Data Network 564
Endpoint 570
Session Signaling 340
Proxy 542a
Proxy 542b
Proxy 542c
Media Routing 330
Control Plane 514
TURN/ STUN 532a
TURN/ STUN 532b
1
2
3
4

Media Transport
System
125
Skill Service
302
1
2
3
4
5
Control Plane
512
MTS API
610
Gateways
350
Skill 1
Media Processing Unit
522
Pipeline
App
524a
Media Session
Orchestrator
(MESO)
310
Endpoint Registry
516
SIP Bridge
510
Endpoint
570
Media
Storage
910
Media Processing
320
Media Routing
330
Control Plane
514
TURN/
STUN
532a
TURN/
STUN
532b
Session Signaling
340
Proxy
542a
Proxy
542b
Proxy
542c Endpoint
570
Gateways
350
MTS API
610
Media Session Orchestrator (MESO)
310
Endpoint Registry
516
SIP Bridge
510
Session Signaling
340
Proxy
542a
Proxy
542b
Proxy
542c
3
Skill Service
302
Control Plane
512
Skill 1
Media Processing Unit
522
Pipeline App
524a
1
2
Media Processing
320
Media Routing
330
Control Plane
514
TURN/ STUN
532a
TURN/ STUN
532b
Media Transport System
125
Media Storage
910

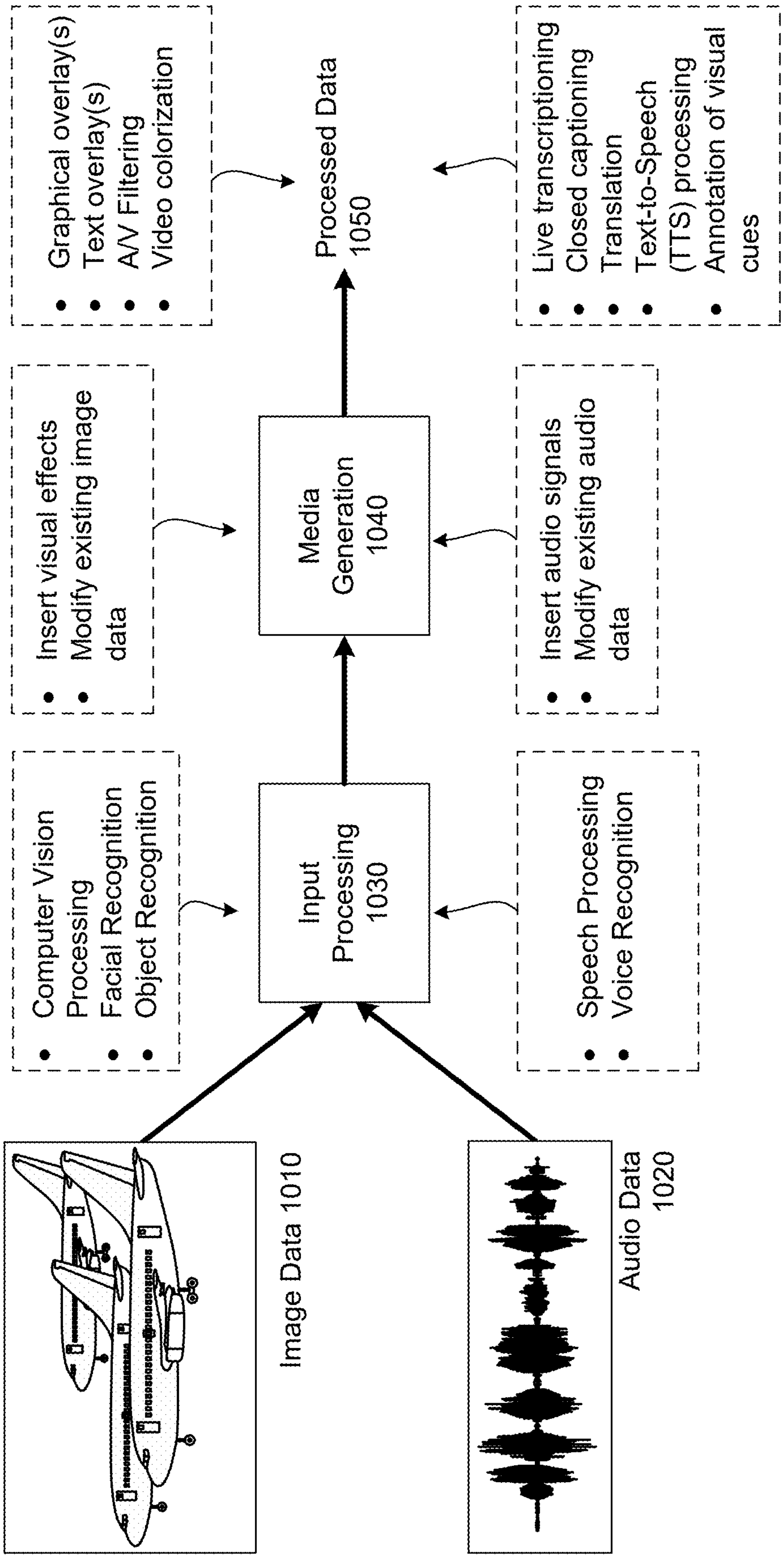

FIG. 10

Image Data 1010

Audio Data 1020

- Computer Vision Processing
- Facial Recognition
- Object Recognition

- Speech Processing
- Voice Recognition

Input Processing 1030

- Insert visual effects
- Modify existing image data

- Insert audio signals
- Modify existing audio data

Media Generation 1040

- Graphical overlay(s)
- Text overlay(s)
- A/V Filtering
- Video colorization

- Live transcriptioning
- Closed captioning
- Translation
- Text-to-Speech (TTS) processing
- Annotation of visual cues Processed Data 1050

Requests
1210
Load Balancer
1220
Control Plane
Instance
1230a
Control Plane
Instance
1230b
Control Plane
Instance
1230n
Direct Invocation
1235
Metric Stream
Monitor
1240
Metrics
1265
Metrics
1260
MPU Instance
1250a
MPU Instance
1250b
MPU Instance
1250n Endpoints
570
Media Session Orchestrator (MESO)
310
Load Balancer
1310
MESO Router
1320a
MESO Router
1320b
MESO Router
1320n
Load Balancer
1330
MESO Executor
1340a
MESO Executor
1340b
MESO Executor
1340n Device 110
Network(s) 199
Antenna 1514
Microphone(s) 1520
Speaker 1512
Display 1516
Camera 1518
I/O Device Interfaces 1502
Controller(s) / Processor(s) 1504
Memory 1506
Storage 1508
Bus 1524

Media Transport System 125

Remote System 120

Speech-Detection Device 110e

Display Device 110f

Network(s) 199

Vehicle 110a

Tablet Computer 110d

Smart Watch 110c

Smart Phone 110b

Smart TV 110g

08:00

MEDIA SESSION ORCHESTRATOR

BACKGROUND

With the advancement of technology, the use and popularity of electronic devices has increased considerably. Electronic devices are commonly used to capture and send audio data and/or image data.

BRIEF DESCRIPTION OF DRAWINGS

For a more complete understanding of the present disclosure, reference is now made to the following description taken in conjunction with the accompanying drawings.

FIG. 1A is a conceptual diagram of a system configured to perform media processing during a communication session according to embodiments of the present disclosure.

FIGS. 3A-3B illustrate example component diagrams of a media transport system configured to perform media processing according to embodiments of the present disclosure.

FIG. 5 illustrates an example component diagram of a media transport system configured to perform media processing according to embodiments of the present disclosure.

FIG. 10 illustrates examples of potential processing that can be performed by a media processing unit according to embodiments of the present disclosure.

DETAILED DESCRIPTION

Figure 1B:
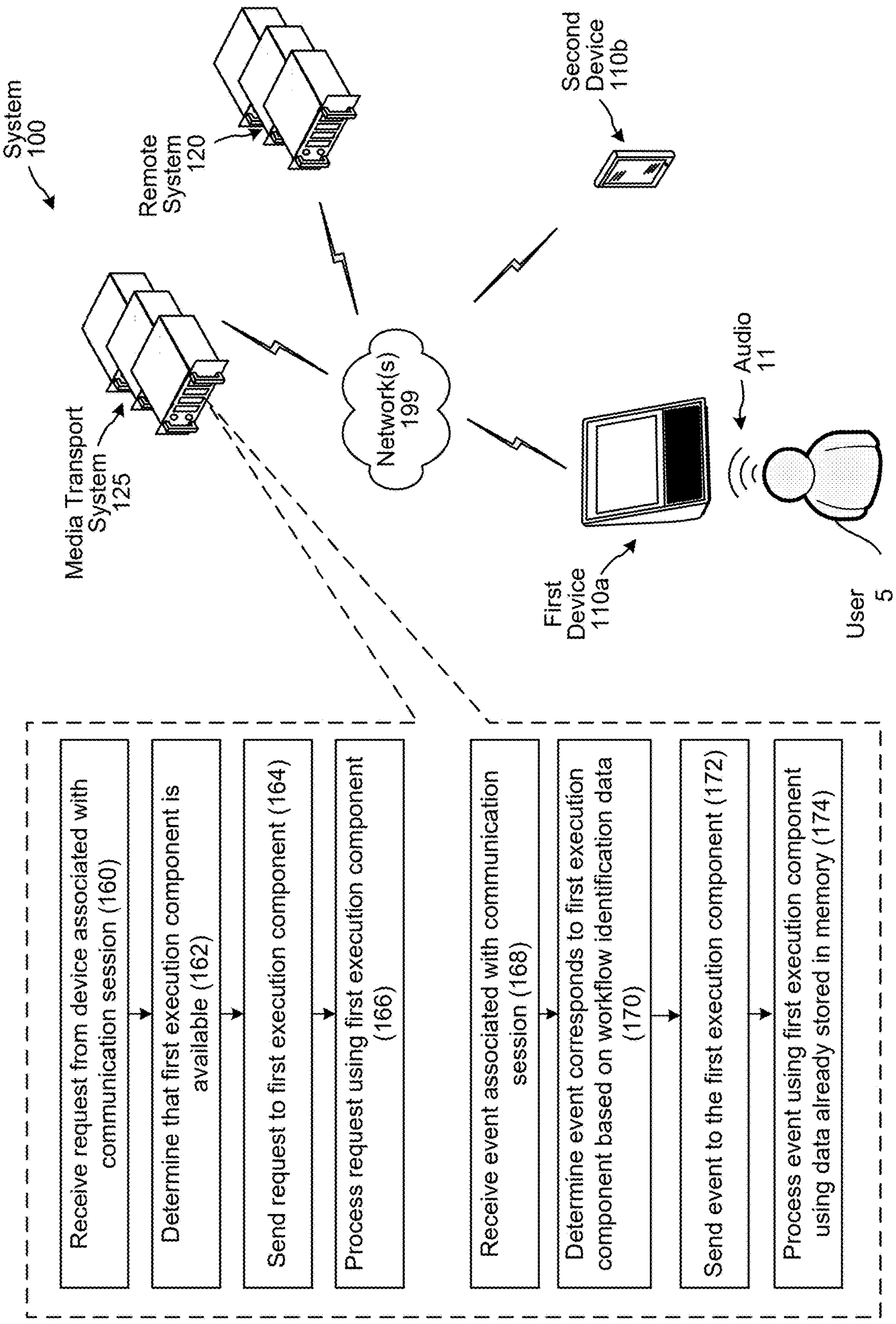
FIG. 1B is a flowchart conceptually illustrating performing media session orchestration according to embodiments of the present disclosure.

Electronic devices are commonly used to capture and send audio data and/or image data. Due to a variety of different data networks and signaling protocols, it can be challenging to establish a communication session between devices and/or route data between the devices during the communication session. In addition, the data is typically processed on local devices, which is limited by a processing capability of the local device.

Further, typically communication sessions between computing devices are handled such that each device may be operating the same application to enable the call. For example, for a Skype call both devices may be operating Skype, for a FaceTime call both devices may be operating FaceTime, etc. Thus, in order for a user to operate a particular calling feature, it must be offered as part of the calling service. For example, if a user wanted to turn on closed captioning on a Skype call, closed captioning must be offered as an option within Skype. Such application specific feature enablement also applies to other media communication sessions that may not necessarily involve user-to-user calls. Video streaming is another example. If a user wanted to turn on closed captioning while watching a streaming movie, closed captioning must be offered as an option within the streaming service being used. The same problem arises from any media manipulation that may be desired such as audio translation, image filters, and the like. While certain services/applications may offer certain options for media manipulation, such options are typically limited by the resources of the application service provider. For example, while some services may offer image filtering as an option, they may not offer closed captioning or language translation due to the high cost in building and enabling such features for their users. Further, many of these options offered within an application are actually executed by a specific device on one end of the session (e.g., the closed captioning data for a movie is pre-stored by the video streaming service and only displayed on an end user device if selected).

Offered is a computing architecture that allows routing of media communication requests in a unique way to allow a media stream (for example a media download session, user-to-user call, etc.) to be routed through a component that allows one or more media processing units (MPUs) to operate on the media data to alter video, audio, or other media data as it is routed from a source to a destination. The MPUs may be customized and activated as needed to perform various media alteration operations (such as translation, image filtering, etc.). Further, because the offered architecture is performed on the cloud, meaning by remote devices that may sit in-between the devices at either end of the media session, the MPUs may offer a variety of different media processing services independent from the particular streaming/calling application. This allows many different application/skill providers to create their own MPUs that may be subscribed to by different applications and/or users. For example, two different MPUs may perform closed captioning and an application/user may select the one that they desire for their operations. In another example, multiple different MPUs may offer translation services and an application/user may select the one that they desire. Thus an application involved in media transportation may allow its users to select from many different media processing services offered by the MPUs allowing the application to not incur the cost of building those services while at the same time allowing its users to select from a multitude of potentially desired media processing operations.

Additionally, the offered architecture and different components allow the management of a communication session in a way that enables performing of media processing in real-time or near real-time (e.g., with reduced latency) thus enabling media content to be altered without significant delays in routing between one endpoint and another. For example, a media transport system may include media routing services that route data during a communication session. To enable unique functionality, the media transport system may route the data to media processing services that perform media processing prior to sending the data to recipient devices. Thus, audio data and/or image data may be modified by the media transport system while routing the data during the communication session, enabling unique functionality by the media transport system using a simplified interface.

FIG. 1A illustrates a system configured to perform media processing during a communication session according to embodiments of the present disclosure. Although the figures and discussion of the present disclosure illustrate certain operational steps of the system in a particular order, the steps described may be performed in a different order (as well as certain steps removed or added) without departing from the intent of the disclosure. While the below description describes the steps of FIG. 1A being performed by the media transport system 125, one skilled in the art will appreciate that the device(s) 110 and/or the remote system 120 may perform some or all of the steps described with respect to FIG. 1A without departing from the present disclosure.

As illustrated in FIG. 1A, a first device 110*a* may be associated with a user 5 and may communicate with a second device 110*b*, a remote system 120, and/or a media transport system 125 using one or more networks 199. If the user 5 would like to start a conversation with a remote user associated with the second device 110*b*, the user 5 may generate a request to initiate a communication session with the second device 110*b*. As will be described in greater detail below, the media transport system 125 may initiate and manage the communication session between the first device 110*a* and the second device 110*b*, which may include audio data and/or image data (e.g., image(s) and/or video(s)). During the communication session, the media transport system 125 may perform media processing to modify the audio data and/or image data being sent between the two devices 110. Performing media processing may enable unique functionality to the user 5 and detailed examples of media processing are described in greater detail below with regard to FIG. 10.

As illustrated in FIG. 1A, in some examples the first device 110*a* may be a speech-controlled device and may detect audio 11 spoken by a user 5. The first device 110*a* may determine the audio 11 includes a wakeword and may then send audio data corresponding to the audio 11 to the remote system 120. The remote system 120 may receive the audio data from the first device 110*a* and process the audio data, for example using speech processing such as automatic speech recognition (ASR) processing, natural language understanding (NLU) processing, and/or the like, to determine that the audio data represents a request to initiate a communication session with the second device 110*b*. Although FIG. 1A illustrates the first device 110*a* as a speech-controlled device, many other devices may be used without departing from the disclosure, such as a smartphone, television, computer, appliance, or other device depending on system configuration. Additionally or alternatively, the user 5 may provide input data other than audio data without departing from the disclosure. Thus, the first device 110*a* may send a request directly to the media transport system 125 without departing from the disclosure.

In one example, the remote system 120 is configured to enable voice commands (e.g., perform ASR, NLU, etc. to identify a spoken command included in audio data), whereas the media transport system 125 is configured to enable communication sessions (e.g., using session initiation protocol (SIP) or the like). For example, the media transport system 125 may send SIP messages to endpoints (e.g., recipient devices) in order to establish a communication session for sending and receiving audio data and/or image data (e.g., image(s) and/or video(s)). The communication session may use network protocols such as real-time transport protocol (RTP), RTP Control Protocol (RTCP), Web Real-Time communication (WebRTC), and/or the like to send data packets (e.g., User Datagram Protocol (UDP) data packets). For example, the media transport system 125 may send SIP messages to initiate a single RTP media stream between two endpoints (e.g., direct RTP media stream between the first device 110*a* and the second device 110*b*) and/or to initiate and facilitate RTP media connections between the two endpoints (e.g., RTP media streams between the first device 110*a* and the media transport system 125 and between the media transport system 125 and the second device 110*ab*). During a communication session, the media transport system 125 may initiate multiple media streams, with a first media stream corresponding to data (e.g., audio data and/or image data) sent from the first device 110*a* to the second device 110*b* and a second media stream corresponding to data sent from the second device 110*b* to the first device 110*a*, although for ease of explanation this may be illustrated as a single RTP media stream.

The media transport system 125 may include logic to convert commands received from the remote system 120 into SIP requests/responses and may handle sending outgoing SIP requests and sending responses to incoming SIP requests. For ease of explanation, the disclosure illustrates the system using SIP. However, the disclosure is not limited thereto and the system may use any communication protocol for signaling and/or controlling communication sessions without departing from the disclosure. Similarly, while some descriptions of the communication sessions refer only to audio data, the disclosure is not limited thereto and the communication sessions may include audio data, image data, video data, and/or any other multimedia data without departing from the disclosure. Further, while a communication session may be illustrated with respect to a call between one user device and another, a communication session may also include a remote media service sending media data to a user device (e.g., a video stream), one server device sending media to another server device (such as transport of content between business) or other session involving the sending of media data.

As illustrated in FIG. 1A, the media transport system 125 may receive (130) a request to initiate a communication session. For example, the media transport system 125 may receive a request from the first device 110*a* to initiate a communication session between the first device 110*a* and the second device 110*b*. The media transport system 125 may determine (132) parameters of the communication session, determine (134) media processing to perform during the communication session (e.g., processing to apply to media content sent during the communication session), and determine participants to include in the communication session (e.g., the first device 110*a*, the second device 110*b*, additional participants, etc.). In some examples, a participant may correspond to a user profile that is associated with one or more devices. For example, the first device 110*a* may indicate a specific contact to invite to the communication session, and the media transport system 125 may identify contact data corresponding to the contact along with a list of one or more devices associated with the contact data. Further, while a communication session may be illustrated with respect to a call between one user device and another, a communication session may also include a remote media service sending media data to a user device (e.g., a video stream), one server device sending media to another server device (such as transport of content between business) or other session involving the sending of media data.

The media transport system 125 may send a communication request to each of the participants (e.g., one or more devices associated with the participants, such as second device 110*b*), may determine (140) routing data for the communication session, and may establish (142) the communication session using the routing data. For example, the media transport system 125 may determine network address(es), telephone number(s), and other routing information and may use network components to route data between the first device 110*a* and the second device 110*b*. The routing data may include routing the media session through the appropriate MPU that is to perform the desired media processing. Again, although this step is illustrated with respect to beginning of a communication session the system 125 may also determine new routing data in the middle of a communication system, for example when a user selects a particular feature to be turned on during a call. This may result in a new routing of a communication session through a new one or more MPUs. While FIG. 1A illustrates an example in which a single device (e.g., second device 110*b*) is associated with the second participant, the disclosure is not limited thereto and the media transport system 125 may send the communication request to multiple devices for a single participant without departing from the disclosure. For example, the media transport system 125 may send the communication request to two or more devices, with the second participant choosing to answer using the second device 110*b*. Further, it should be appreciated that while the discussion herein may focus on a single MPU being activated/included in a communication session, multiple MPUs may also be included depending on system configuration and the desired media processing to occur on media data in a particular communication session.

During the communication session, the media transport system 125 may receive (144) first data from the first device 110*a*, may perform (146) media processing on the first data to generate second data, and may send (148) the second data to the second device. For example, the media transport system 125 may perform media processing to modify image data and/or audio data to perform unique functionality during the communication session. The media processing may be performed by the desired MPU as the media data is routed through the particular MPU, as further detailed below. While FIG. 1A only illustrates the media processing being performed in a single direction, the disclosure is not limited thereto and the media transport system 125 may perform media processing on data sent from the second device 110*b* to the first device 110*a* without departing from the disclosure.

As used herein, a communication session may refer to a period of time during which two or more devices are sending and receiving data. For example, a bidirectional synchronous communication session may correspond to a video call in which a first device sends first image data to a second device and receives second image data from the second device. However, the disclosure is not limited thereto and the data may be sent asynchronously without departing from the disclosure. Additionally or alternatively, the communication session may be unidirectional, with image data being sent from the first device to the second device but not from the second device to the first device. For example, the first device may correspond to the doorbell camera described above and may send image data to the media transport system 125 for processing and/or to a second device so that the user 5 may view the image data. In another example, the first device may correspond to a database or other storage device that stores media content and the media transport system 125 may send the media content to the second device so that the user 5 may view the media content (e.g., video streaming).

For ease of illustration, the disclosure may refer to a communication session or a media session interchangeably. For example, a data path corresponding to a video call may be referred to as a communication session (e.g., as it enables communication between multiple devices and/or users) or a media session (e.g., as it includes media content such as image data). Similarly, a data path enabling a user 5 to consume media content (e.g., streaming video) may be referred to as a media session (e.g., as it includes media content such as image data) or a communication session (e.g., as the image data is sent between multiple devices) without departing from the disclosure. Thus, "communication session" is not limited to an interaction between two or more users 5 and "media session" is not limited to a unidirectional broadcast.

As used herein, media content may refer to any data known to one of skill in the art, including text data, image data, audio data, and/or the like without departing from the disclosure. Similarly, image data may represent a single image, a series of images, a single video, a collection of videos, and/or the like without departing from the disclosure. Thus, for ease of explanation, image data may be used to indicate both image data and video data without departing from the disclosure. Additionally or alternatively, image data may be embedded with audio data and/or may be associated with separate audio data without departing from the disclosure.

To enable the media transport system 125 to perform media processing, the media transport system 125 may include a distributed set of workflow execution components that execute asynchronous workflows. An example of such an execution component may be a media session orchestrator (MESO) as discussed further below. For example, the media transport system 125 may select one of a plurality of workflow execution components to initiate a new communication session. However, to reduce latency associated with performing media processing, the media transport system 125 may assign an individual workflow to a single execution component. Thus, the execution component may process any requests received that are associated with the workflow, while keeping communication session data loaded into memory between requests and/or events to decrease an amount of latency. While conventional techniques may perform checkpointing to store the communication session data in a storage component between events, the media transport system 125 may keep the communication session data loaded in memory for immediate processing of an incoming request (e.g., all logic is running in memory on a single host, enabling fast execution).

FIG. 1B is a flowchart conceptually illustrating performing media session orchestration according to embodiments of the present disclosure. As illustrated in FIG. 1B, the media transport system 125 may receive (160) a request from a device (e.g., first device 110*a*) that is associated with a communication session (e.g., request to initiate the communication session). Such a request may be, for example, a request to initiate a communication session, a request to perform media processing (for example using an MPU), or the like. The media transport system 125 may determine (162) that a first execution component is available to process the request, may send (164) the request to the first execution component, and may process (166) the request using the first execution component. For example, the media transport system 125 may assign the communication session to the first execution component and load logic associated with the communication session into memory associated with the first execution component. Thus, the first execution component may process future requests and/or events without having to load the logic back into memory, decreasing an amount of latency associated with processing the request/event.

The media transport system 125 may receive (168) an event associated with the communication session (for example an acceptance of a media communication session), may determine (170) that the event corresponds to the first execution component based on workflow identification data, may send (172) the event to the first execution component, and may process (174) the event using the first execution component using data already stored in memory. The steps illustrated in FIG. 1B are described in greater detail below with regard to FIGS. 11-14.

Figure 2:
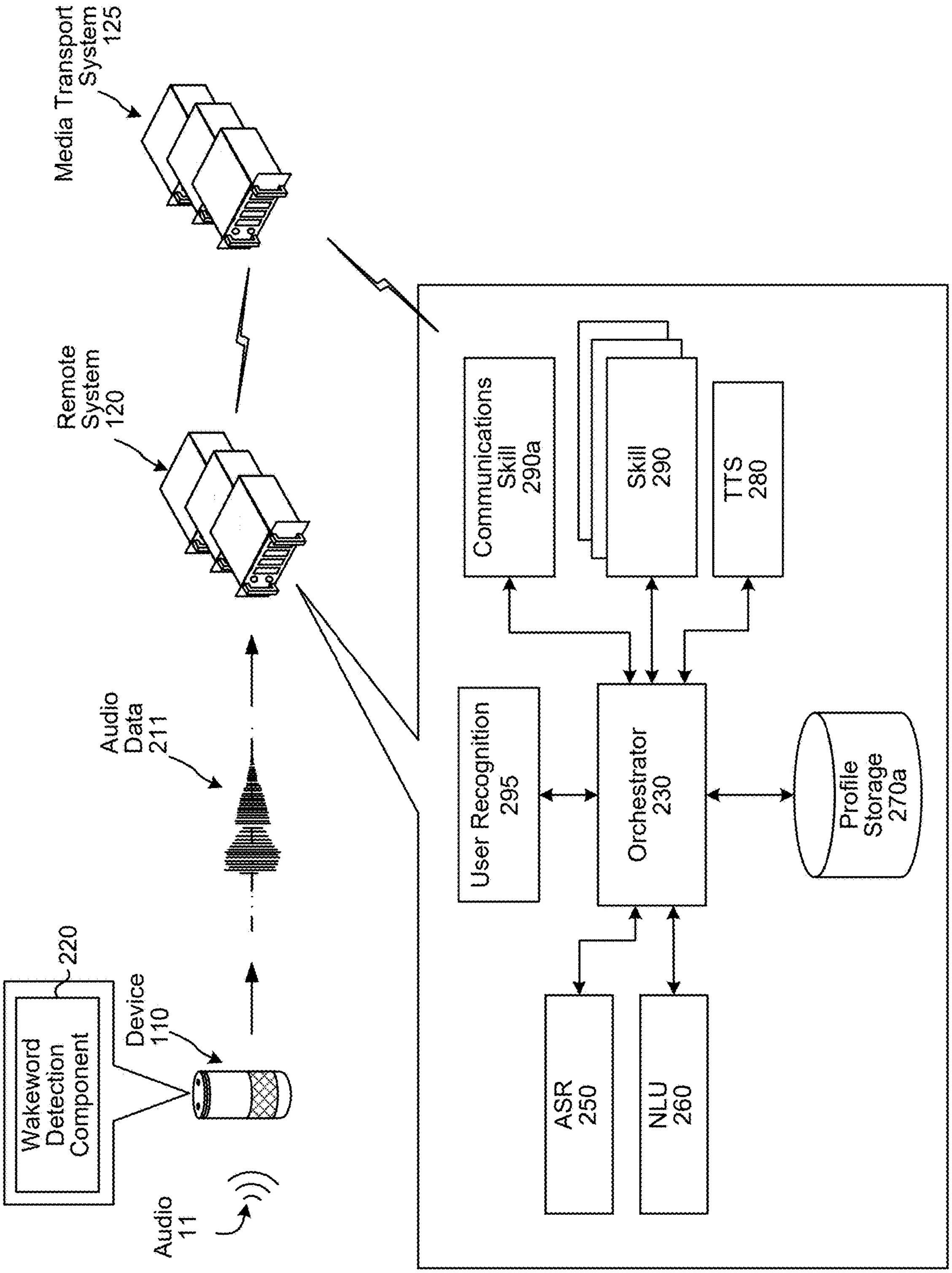
FIG. 2 is a conceptual diagram of components of a system according to embodiments of the present disclosure.

Although not necessarily limited to such, the system may operate using various speech processing components as described in FIG. 2. The various components may be located on same or different physical devices. Communication between various components may occur directly or across a network(s) 199.

An audio capture component(s), such as a microphone or array of microphones of the device 110, captures audio 11. The device 110 processes audio data, representing the audio 11, to determine whether speech is detected. The device 110 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. This process may also be referred to as keyword detection, with a wakeword being a specific example of a keyword. An example wakeword is "Alexa."

Wakeword detection is typically performed without performing linguistic analysis, textual analysis, or semantic analysis. Instead, the audio data representing the audio 11 may be analyzed to determine if specific characteristics of the audio data match preconfigured acoustic waveforms, audio signatures, or other data to determine if the audio data "matches" stored audio data corresponding to a wakeword. The stored audio data may be provided by the remote system 120 and/or may be provided by the user 5.

The wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may wake and begin transmitting audio data 211, representing the audio 11, to the remote system 120. The audio data 211 may include data corresponding to the wakeword, or the portion of the audio data 211 corresponding to the wakeword may be removed by the device 110 prior to sending the audio data 211 to the remote system 120.

Upon receipt by the remote system 120, the audio data 211 may be sent to an orchestrator component 230. The orchestrator component 230 may include memory and logic that enable the orchestrator component 230 to transmit various pieces and forms of data to various components of the system, as well as perform other operations. The orchestrator component 230 sends the audio data 211 to an ASR component 250. The ASR component 250 transcribes the audio data 211 into text data. The text data output by the ASR component 0 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, for example via the orchestrator component 230. The text data sent from the ASR component 250 to the NLU component 260 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent (e.g., intent data) representing an action that a user desires be performed as well as pieces of the input text data that allow a device (e.g., the device 110, the remote system 120, the media transport system 125, etc.) to execute the intent. For example, if the text data corresponds to "call John," the NLU component 260 may determine an intent that the system establish a two-way communication channel between the device 110 originating the call and a device of the recipient "John." For further example, if the text data corresponds to "tell John I am on my way," the NLU component 260 may determine an intent that the system send a message to a device of the recipient "John," with the message corresponding to "I am on my way."

The NLU component 260 outputs NLU results to the orchestrator component 230. The NLU results may include an NLU hypothesis, including a representation of an intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

The orchestrator component 230 may send the NLU results to an associated skill component 290. If the NLU results include multiple NLU hypotheses, the orchestrator component 230 may send a portion of the NLU results corresponding to the top scoring NLU hypothesis to a skill component 290 associated with the top scoring NLU hypothesis.

A "skill" or "skill component" may be software running on the remote system 120 that is akin to a software application running on a traditional computing device. That is, a skill component 290 may enable the remote system 120 to execute specific functionality in order to perform one or more actions (e.g., provide information to a user, display content to a user, output music, or perform some other requested action). The remote system 120 may be configured with more than one skill component 290. For example, a weather skill component may enable the remote system 120 to provide weather information, a ride sharing skill component may enable the remote system 120 to schedule a trip with respect to a ride sharing service, a restaurant skill component may enable the remote system 120 to order food with respect to a restaurant's online ordering system, a communications skill component may enable the system to perform messaging or multi-endpoint communications, etc. A skill component 290 may operate in conjunction between the remote system 120 and other devices such as the device 110 or a media transport system 125 in order to complete certain functions. Inputs to a skill component 290 may come from various interactions and input sources. A skill component may include a communications skill 290*a* which may correspond to a service for performing media processing that may be operated, for example, by an MPU as discussed below.

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the remote system 120 (as illustrated in FIG. 2) or may be located at whole (or in part) with one or more separate systems. Unless expressly stated otherwise, reference to a skill, skill device, or skill component may include a skill component operating within the remote system 120 (for example as skill component 290) and/or skill component operating within a system separate from the remote system 120.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the remote system 120, a ride sharing skill may involve a ride sharing skill component scheduling a trip with respect to a ride sharing service, an order pizza skill may involve a restaurant skill component ordering pizza with respect to a restaurant's online ordering system, etc.

A skill component 290 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, gaming skills, as well as custom skills that are not associated with any pre-configured type of skill. A skill may also be associated with media operations that may be performed by an MPU. This allows a skill develop to offer media processing features an independent services that may be invoked by a user. For example, a user may say "Alexa, call mom using CatFace" which may result in the system processing the command to initiate a device-to-device video call between the user's device and a device belonging to the user's mother, while routing the video call through an MPU associated with the "CatFace" skill, which may perform media operations such as recognizing a human face and replacing it with a cat face. As can be appreciated, many different media processing skills may be implemented.

The remote system 120 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The remote system 120 may include profile storage 270 and/or the media transport system 125 may include its own profile storage. The profile storage 270 may include a variety of information related to individual users, groups of users, etc. that interact with the system. The profile storage 270 may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the component(s) of the system(s) and/or user are located. Permissions may be obtained from a user associated with the device 110, or other devices discussed herein.

The remote system 120 may include a user recognition component 295 that recognizes one or more users associated with data input to the system. The user recognition component 295 may take as input the audio data 211 and/or text data output by the ASR component 250. The user recognition component 295 determines scores indicating whether user input originated from a particular user. For example, a first score may indicate a likelihood that the user input originated from a first user, a second score may indicate a likelihood that the user input originated from a second user, etc. The user recognition component 295 also determines an overall confidence regarding the accuracy of user recognition operations. The user recognition component 295 may perform user recognition by comparing audio characteristics in the audio data 211 to stored audio characteristics of users. The user recognition component 295 may also perform user recognition by comparing biometric data (e.g., fingerprint data, iris data, etc.), received by the system in correlation with the present user input, to stored biometric data of users. The user recognition component 295 may further perform user recognition by comparing image data (e.g., including a representation of at least a feature of a user), received by the system in correlation with the present user input, with stored image data including representations of features of different users. The user recognition component 295 may perform additional user recognition processes, including those known in the art. Output of the user recognition component 295 may include a single user identifier corresponding to the most likely user that originated the present user input. Alternatively, output of the user recognition component 295 may include an N-best list of user identifiers with respective scores indicating likelihoods of respective users originating the present user input. The output of the user recognition component 295 may be used to inform NLU processing as well as processing performed by other components of the system.

Figure 3B:
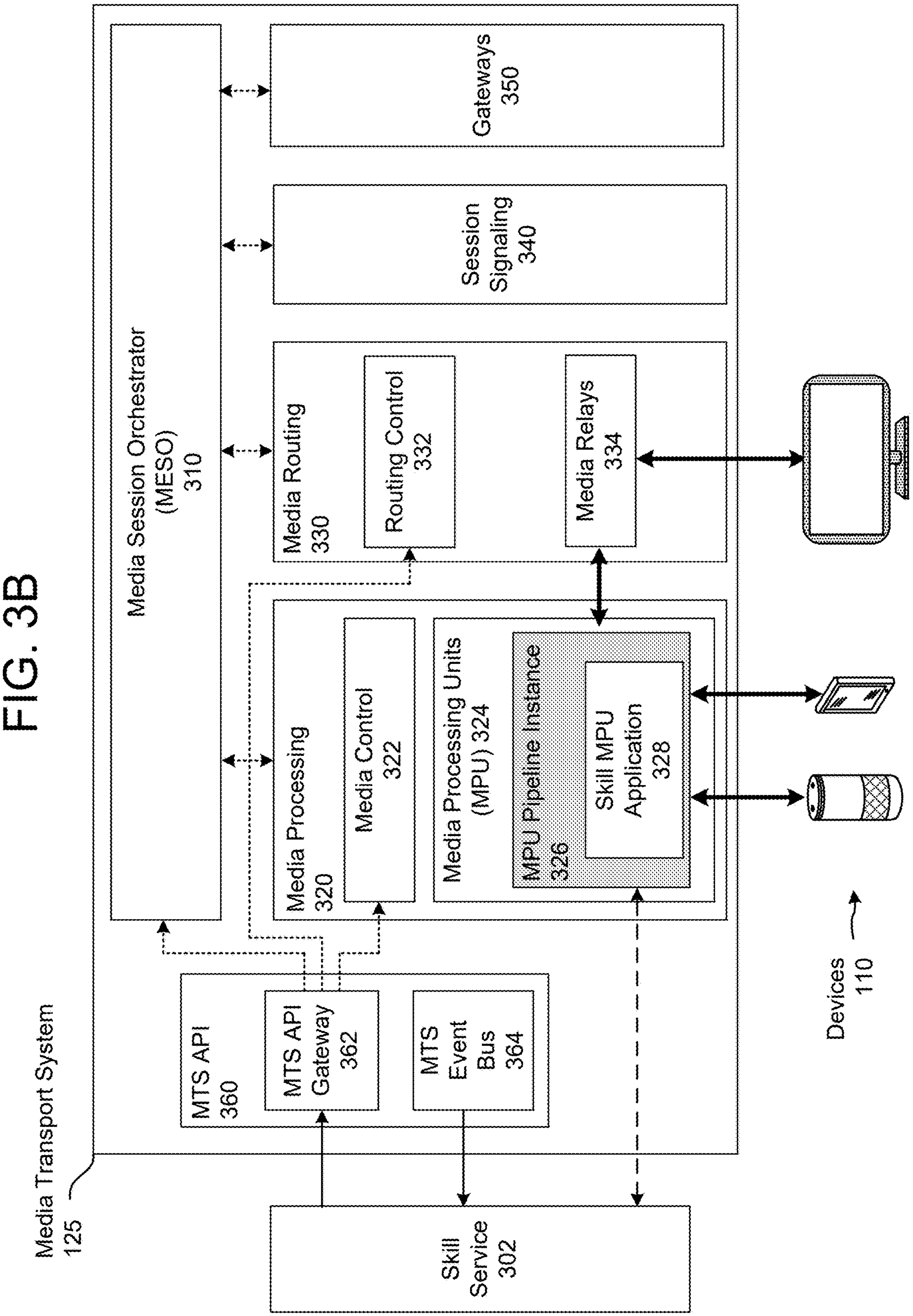

FIGS. 3A-3B illustrate example component diagrams of a media transport system configured to perform media processing according to embodiments of the present disclosure. As illustrated in FIG. 3A, a skill service 302 may interact with a media transport system 125 to request and utilize resources available within the media transport system 125. For example, the skill service 302 may correspond to an application (e.g., process, skill, and/or the like) running on a local device (e.g., device 110) and/or one or more servers, and the skill service 302 may enable a user 5 to interact with the media transport system 125 to initiate and manage a communication session involving media processing, although the disclosure is not limited thereto. To illustrate an example, the user 5 may input a command to an application programming interface (API) for the skill service 302 that is running on the device 110. The device 110 may send a request corresponding to the command to the one or more servers associated with the skill service 302 and the one or more servers may send the request to the media transport system 125.

In some examples, the skill service 302 may be developed (e.g., programmed) by an internal client or other development team (e.g., developer, programmer, and/or the like) to perform specific functionality. Thus, the skill service 302 may be designed to utilize specific resources available within the media transport system 125 and a finished product is made available to the public (e.g., end-user such as user 5). For example, the skill service 302 may enable the user 5 to initiate and/or participate in a communication session (e.g., group conference call, such as videoconferencing), to consume media content (e.g., streaming video data) with unique functionality or processing, and/or perform additional functionality (e.g., perform computer vision processing on image data, speech processing on audio data, machine learning, and/or the like) without departing from the disclosure. In this example, the media transport system 125 provides a simplified interface that enables the internal client to utilize resources within the skill service 302, but the interface and/or resources are not visible to and/or customizable by the end-user that uses the skill service 302.

The disclosure is not limited thereto, however, and in other examples the skill service 302 may be made available for external development to third party clients and/or to individual users. Thus, the media transport system 125 may provide a simplified interface for unique programming without technical expertise. For example, an individual user 5 may customize the skill service 302 using a drag and drop graphical user interface (GUI) to enable unique functionality, enabling the user 5 to program custom routines, skills, and/or the like. To illustrate an example, the user 5 may customize the skill service 302 to receive image data generated by an image sensor, process the image data using computer vision, and then perform specific action(s). For example, the skill service 302 may be programmed so that when a device (e.g., doorbell camera) detects motion and captures image data, the skill service 302 processes the image data using facial recognition to detect authorized users (e.g., family members or other invited guests) and either performs a first action (e.g., unlock the front door when an authorized user is detected) or performs a second action (e.g., send a notification to the user 5 including image data representing an unauthorized user). Thus, the interface and/or resources associated with the media transport system 125 may be visible to and/or customizable by the end-user that uses the skill service 302 without departing from the disclosure.

To enable the skill service 302 to request and utilize resources from within the media transport system 125, the media transport system 125 may include a media session orchestrator (MESO) component 310 configured to coordinate (e.g., define, establish, manage, etc.) a communication session (e.g., media session).

As illustrated in FIG. 3A, the MESO component 310 may interface between services that fall within four distinct categories: media processing services 320, media routing services 330, session signaling services 340, and/or gateway services 350.

Media processing services 320 refers to processing media content to enable unique functionality. For example, the media transport system 125 may provide a hosted back-end that performs media processing on individual streams of data, enabling the skill service 302 to define and control how media content is processed by the media transport system 125. The media processing services 320 may correspond to real time processing (e.g., data is processed during run-time, such as while streaming video to a user 5, during a video-conference, and/or the like) or offline processing (e.g., data is processed and stored in a database for future requests, such as during batch processing) without departing from the disclosure.

The media processing services 320 may include at least one media control component 322 and/or at least one media processing unit (MPU) 324 (e.g., first MPU 324*a*, second MPU 324*b*, etc.). The media control component 322 may coordinate media processing by sending control data to and/or receiving control data from other components within the media transport system 125. For example, the MESO component 310 may send a request to the media control component 322 to launch a specific application (e.g., skill, process, etc.) to perform media processing and the media control component 322 may send an instruction to a corresponding MPU 324.

The MPU 324 may be configured to perform media processing to enable additional functionality. Thus, the MPU 324 may receive first data and process the first data to generate second data. As part of performing media processing, the MPU 324 may perform speech processing on audio data and/or image data, perform computer vision processing on image data, modify audio data and/or image data, apply visual effects (e.g., overlay or other graphical element(s)) to image data, and/or the like to enable interesting functionality without departing from the disclosure. For example, the MPU 324 may generate subtitles (e.g., text data) corresponding to speech represented in image data, may translate the subtitles to a different language, may perform text-to-speech processing to enable additional functionality (e.g., describing visual cues for someone that is visually impaired, replacing dialog with speech in a different language, etc.), may perform voice recognition to identify voices represented in audio data, may perform facial recognition to detect and/or identify faces represented in image data, may perform object recognition to detect and/or identify objects represented in image data, may add a graphical overlay to image data (e.g., censoring portions of the image data, adding symbols or cartoons to the image data, etc.), may perform other processing to media content (e.g., colorize black and white movies), and/or the like without departing from the disclosure.

In some examples, the media transport system 125 may perform media processing using two or more MPUs 324. For example, the media transport system 125 may perform first media processing using a first MPU 324*a* and perform second media processing using a second MPU 324*b*. To illustrate an example, a communication session may correspond to a video chat implementation that includes image data and audio data and the media transport system 125 may perform media processing in parallel. For example, the media transport system 125 may separate the image data and the audio data, performing first media processing on the image data and separately performing second media processing on the audio data, before combining the processed image data and the processed audio data to generate output data. However, the disclosure is not limited thereto, and in other examples the media transport system 125 may perform media processing in series without departing from the disclosure. For example, the media transport system 125 may process first image data using the first MPU 324*a* (e.g., first media processing) to generate second image data and may process the second image data using the second MPU 324*b* (e.g., second media processing) to generate output image data. Additionally or alternatively, the media transport system 125 may perform multiple media processing steps using a single MPU 324 (e.g., more complex media processing) without departing from the disclosure.

The media transport system 125 may include media routing services 330 that are configured to route media (e.g., send data packets) to and from the device(s) 110 via the network(s) 199. For example, the media routing services 330 may include one or more routing control components 332, media relay components 334, point of presence selection components 336, geographic selection components 337, and/or capability selection components 338. Examples of media relay components may include a Session Traversal of User Datagram Protocol (UDP) Through Network Address Translators (NATs) system (e.g., STUN system) and/or a Traversal Using relays around NAT (TURN) system, although the disclosure is not limited thereto. While FIG. 3A illustrates the media routing services 330 including the point of presence selection components 336, geographic selection components 337, and/or capability selection components 338 as separate components, this is for ease of illustration and the disclosure is not limited thereto. Instead, a single component may perform point of presence selection, geographic selection, and/or capability selection without departing from the disclosure.

In some examples, the media transport system 125 may separate the MPUs 324 from the network(s) 199 so that the MPUs 324 do not have a publicly accessible internet protocol (IP) address (e.g., cannot route outside of a local network). Thus, the system 100 may use the media relay components 334 to send the first data from a first device to the MPUs 324 and/or the second data (e.g., processed data) generated by the MPUs 324 from the MPUs 324 to a second device. For example, an individual device 110 may be associated with a specific TURN server, such that the system 100 may route data to and from the first device using a first TURN server and route data to and from the second device using a second TURN server.

While the example described above illustrates routing data to and from the media processing services 320, the media routing services 330 may be used to route data separately from the media processing services 320 without departing from the disclosure. For example, the system 100 may route data directly between devices 110 using one or more TURN servers (e.g., TURN system) without departing from the disclosure. Additionally or alternatively, the system 100 may route data using one or more STUN servers (e.g., STUN system), such as when a device 110 has a publicly accessible IP address. In some examples, the system may establish communication sessions using a combination of the STUN system and the TURN system without departing from the disclosure. For example, a communication session may be more easily established/configured using the TURN system, but may benefit from latency improvements using the STUN system. Thus, the system 100 may route data using the STUN system, the TURN system, and/or a combination thereof without departing from the disclosure.

In addition to routing data, the media routing services 330 also perform topology optimization. For example, the media routing services 330 may include geographically distributed media relay components (e.g., TURN/STUN servers) to enable the media transport system 125 to efficiently route the data packets. For example, the media routing services 330 may include a control plane that coordinates between the media relay components to select an optimum route (e.g., data path) to send the data packets. To illustrate an example, the media routing services 330 may determine a location of parties in a communication session and determine a data path that bypasses a particular country or chokepoint in the data network. In some examples, the media routing services 330 may select an enterprise specific route and only use specific connected links associated with the enterprise. Additionally or alternatively, the routing services 330 may apply machine learning models to further reduce latency by selecting the optimum route using non-geographical parameters (e.g., availability of servers, time of day, previous history, etc.).

While the description of the media relay components 334 refers to the STUN system and/or the TURN system, the disclosure is not limited thereto. Instead, the media routing services 330 may use any alternative systems known to one of skill in the art to route the data packets. For example, the media routing services 330 may use any technique that routes UDP data packets and allows the UDP data packets to traverse the NATs without departing from the disclosure. To illustrate an example, the media routing services 330 may include UDP packet forwarding and relay devices instead of the TURN system without departing from the disclosure.

The media transport system 125 may include session signaling services 340 (e.g., edge signaling, signaling network, etc.) that may be configured to coordinate signal paths (e.g., routing of data packets) and/or a type of data packets sent between the devices 110 and server(s) within the media transport system 125. For example, the session signaling services 340 may enable the devices 110 to coordinate with each other to determine how data packets are sent between the devices 110. In some examples, a signal path may correspond to a routing table that indicates a particular route or network addresses with which to route data between two devices, although the disclosure is not limited thereto. As illustrated in FIG. 3A, the session signaling services 340 may support protocols including Session Initiation Protocol (SIP) 341, Real-Time Communication (RTC) protocol 342 (e.g., WebRTC protocol), Alexa Voice Service (AVS) protocol 343, Extensible Messaging and Presence Protocol (XMPP) 344, IP Multimedia Core Network Subsystem (IMS) 345, H.323 standard 346, and/or the like, although the disclosure is not limited thereto.

The media transport system 125 may include gateway services 350 that enable the media transport system 125 to interface with (e.g., send/receive media content or other data) external networks. As illustrated in FIG. 3A, the gateway services 350 may include a public switched telephone network (PSTN) gateway 352, a mobile carrier gateways 354, a social networking gateway 356, an IP communication network gateway 358, and/or other gateways known to one of skill in the art. While FIG. 3A illustrates the gateway services 350 including a single gateway for each external network, this is intended for illustrative purposes only and the gateway services 350 may include multiple gateways for each external network without departing from the disclosure. For example, the gateway services 350 may include multiple PSTN gateways 352 having different locations without departing from the disclosure. Additionally or alternatively, a single type of external network may correspond to multiple external networks without departing from the disclosure. For example, the gateway services 350 may include a first mobile carrier gateway 354 corresponding to a first mobile carrier network and a second mobile carrier gateway 354*b* corresponding to a second mobile carrier network without departing from the disclosure. However, the disclosure is not limited thereto and two or more mobile carrier networks may share a mobile carrier gateway 354 without departing from the disclosure.

To illustrate an example of using the gateway services 350, the system 100 may use the PSTN gateway 352 to establish a communication session with a PSTN device (e.g., wired/wireless telephone, cellular phone, and/or the like that is associated with a PSTN telephone number) using the PSTN. For example, the system 100 may use the session signaling services 340 to send SIP data packets from a device 110 to a PSTN gateway 352. The PSTN gateway 352 may receive the SIP data packets, convert the SIP data packets to audio data in a different format, and send the audio data to the PSTN device via the PSTN. Thus, the gateway services 350 may include a plurality of gateways, with each gateway being associated with a specific external network and configured to act as an interface between the media transport system 125 and the external network.

FIG. 3B illustrates an example of signal paths and data flow between components within the media transport system 125. As illustrated in FIG. 3B, the skill service 302 may send data to a media transport system (MTS) application programming interface (API) 360. The MTS API 360 may include an MTS API gateway component 362 that receives the data (e.g., request) and sends data to the MESO component 310, the media processing services 320, the media routing services 330, and/or other components. For example, FIG. 3B illustrates the MTS API gateway component 362 communicating with the MESO component 310, the media control component 322, and the routing control component 332.

As described above with regard to FIG. 3A, the MESO component 310 may communicate with the media processing services 320, the media routing services 330, the session signaling services 340, and/or the gateway services 350. Internal signaling within the media transport system 125 is represented in FIG. 3B as dotted lines.

The components within the media transport system 125 may process the request received from the MTS API gateway 362 and send data to the MTS API 360 in response to processing the request. For example, components within the media transport system 125 may send data to an MTS event bus 364 of the MTS API 360 and the MTS event bus 364 may send data (e.g., event, notification, etc.) to the skill service 302. Data sent as part of the MTS interface between the skill service 302 and the media transport system 125 is represented in FIG. 3B using a solid line.

As illustrated in FIG. 3B, the skill service 302 may communicate with the MPU 324. For example, the skill service 302 may communicate with an MPU pipeline instance 326 running within the MPU 324 that includes a skill MPU application 328. Thus, the skill service 302 may communicate directly with the skill MPU application as part of an application interface, which is represented as a dashed line in FIG. 3B. In addition to communicating with the skill service 302, the MPU pipeline instance 326 may send data (e.g., media content) to the devices 110, either directly or via the media relay components 334.

As used herein, an MPU pipeline instance or any other instance may refer to a specific component that is executing program code; all of the logic associated with the media processing unit is running in memory in a single host, which decreases latency associated with the media processing. For example, conventional techniques for executing asynchronous workflows perform checkpointing to store data in storage components between events. Thus, when a new event occurs, the conventional techniques retrieve the stored session and loads data into the memory, resulting in a large amount of latency. As part of reducing the latency, the media transport system 125 may use the MESO component 310 to route triggers and events directly to the MPU pipeline instance that is performing the media processing, enabling the media transport system 125 to perform media processing in real-time.

Using the MESO component 310, the media transport system 125 allows skills and/or applications to enable unique functionality without requiring the skill/application to independently develop and/or program the functionality. Thus, the media transport system 125 may offer media processing operations as a service to existing skills/applications. For example, the media transport system 125 may enable a skill to provide closed captioning or other features without building a closed captioning service. Instead, the media transport system 125 may route a communication session through an MPU 324 configured to perform closed captioning. Thus, an MPU 324 configured to enable a specific feature may be utilized to enable the feature on multiple skills without departing from the disclosure.

As the MESO component 310 is capable of executing requests and commands with low latency, the media transport system 125 may utilize multiple components within a single communication session. For example, the media transport system 125 may combine multiple different components (e.g., MPUs 324 associated with one or more skills) to piece together a custom implementation enabling a combination of existing features. To illustrate an example, the media transport system 125 may build back to back SIP user engine that is customizable for a specific implementation. Thus, the MESO component 310 may mix and match different components and/or features to provide a customized experience. For example, the media transport system 125 may provide run-time containers for developing custom applications (e.g., developing and deploying custom applications), as described in greater detail below with regard to FIG. 11.

Figure 4A:
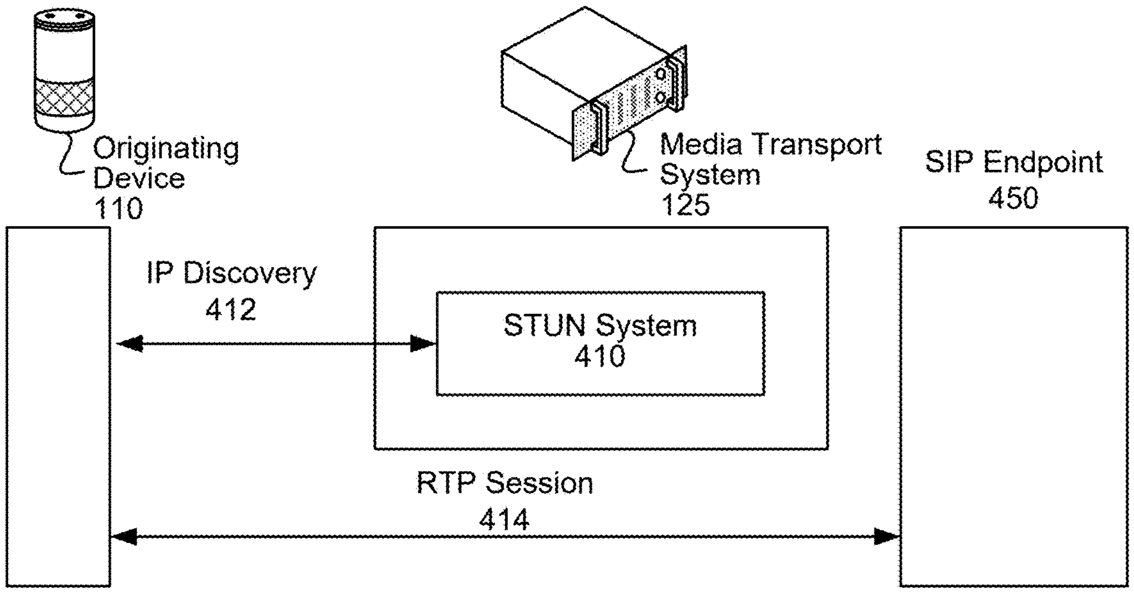
FIGS. 4A-4B illustrate examples of establishing media connections between devices according to embodiments of the present disclosure.
Figure 4B:
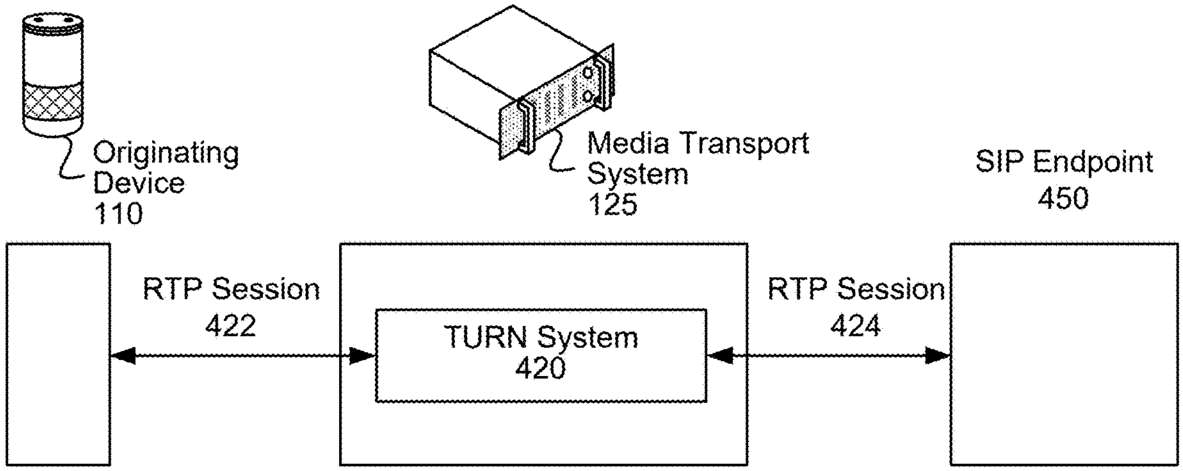

FIGS. 4A-4B illustrate examples of establishing media connections between devices according to embodiments of the present disclosure. In some examples, an originating device 110 may have a publicly accessible IP address and may be configured to establish a real-time transport (RTP) protocol communication session directly with a SIP endpoint 450. The SIP endpoint 450 may correspond to a device 110, a component within the media transport system 125, a gateway component configured to interface with a remote network, and/or a device associated with the remote network itself. To enable the originating device 110 to establish the RTP communication session, the media transport system 125 may include Session Traversal of User Datagram Protocol (UDP) Through Network Address Translators (NATs) system (e.g., STUN system 410). The STUN system 410 may be configured to allow NAT clients (e.g., an originating device 110 behind a firewall) to setup calls to a Voice over Internet Protocol (VoIP) provider hosted outside of the local network by providing a public IP address, the type of NAT they are behind, and a port identifier associated by the NAT with a particular local port. As illustrated in FIG. 4A, the originating device 110 may perform (412) IP discovery using the STUN system 410 and may use this information to set up an RTP communication session 414 (e.g., UDP communication) between the originating device 110 and the SIP endpoint 450 to establish a call.

In some examples, the originating device 110 may not have a publicly accessible IP address. For example, in some types of NAT the originating device 110 cannot route outside of the local network. To enable the originating device 110 to establish an RTP communication session, the media transport system 125 may include Traversal Using relays around NAT (TURN) system 420. The TURN system 420 may be configured to connect the originating device 110 to the SIP endpoint 450 when the originating device 110 is behind a NAT. As illustrated in FIG. 4B, the originating device 110 may establish (422) an RTP session with the TURN system 420 and the TURN system 420 may establish (424) an RTP session with the SIP endpoint 450. Thus, the originating device 110 may communicate with the SIP endpoint 450 via the TURN system 420. For example, the originating device 110 may send audio data and/or image data to the media transport system 125 and the media transport system 125 may send the audio data and/or the image data to the SIP endpoint 450. Similarly, the SIP endpoint 450 may send audio data and/or image data to the media transport system 125 and the media transport system 125 may send the audio data and/or the image data to the originating device 110.

In some examples, the system may establish communication sessions using a combination of the STUN system 410 and the TURN system 420 without departing from the disclosure. For example, a communication session may be more easily established/configured using the TURN system 420, but may benefit from latency improvements using the STUN system 410. Thus, the system may use the STUN system 410 when the communication session may be routed directly between two devices and may use the TURN system 420 for all other communication sessions. Additionally or alternatively, the system may use the STUN system 410 and/or the TURN system 420 selectively based on the communication session being established. For example, the system may use the STUN system 410 when establishing a communication session between two devices (e.g., point-to-point) within a single network (e.g., corporate LAN and/or WLAN), but may use the TURN system 420 when establishing a communication session between two devices on separate networks and/or three or more devices regardless of network(s).

When the communication session goes from only two devices to three or more devices, the system may need to transition from the STUN system 410 to the TURN system 420. Thus, if the system anticipates three or more devices being included in the communication session, the communication session may be performed using the TURN system 420. Similarly, when the communication session goes from three or more devices to only two devices, the system may need to transition from the TURN system 420 to the STUN system 410.

While FIGS. 4A-4B illustrate an RTP communication session being established between the originating device 110 and the SIP endpoint 450, the present disclosure is not limited thereto and the RTP communication session may be established between the originating device 110 and a gateway component or other device associated with the SIP endpoint 450 without departing from the present disclosure. Additionally or alternatively, while FIGS. 4A-4B illustrate examples of enabling communication sessions using the SIP protocol, the disclosure is not limited thereto and the media transport system 125 may use any protocols known to one of skill in the art.

While FIGS. 4A-4B illustrate examples of enabling communication sessions using a data connection (e.g., using Voice over Internet Protocol (VoIP), session initiation protocol (SIP), and/or the like), the disclosure is not limited thereto and the system 100 may enable communication sessions using any type of network without departing from the disclosure. For example, the remote system 120 and/or the media transport system 125 may enable communication sessions using a cellular connection (e.g., mobile phone network) or other external network without departing from the disclosure. Thus, the remote system 120 may be configured to enable voice commands (e.g., perform ASR, NLU, etc. to identify a spoken command included in audio data), whereas the media transport system 125 may be configured to enable communication sessions using the cellular connection. For example, the media transport system 125 may send instructions (e.g., command data) to endpoints (e.g., caller devices, such as the device 110) instructing the endpoint to establish a communication session (e.g., dial a telephone number) in response to the voice command.

FIG. 5 illustrates an example component diagram of a media transport system configured to perform media processing according to embodiments of the present disclosure. As illustrated in FIG. 5, a media transport system 125 may include a media session orchestrator (MESO) component 310 configured to coordinate (e.g., define, establish, manage, etc.) a communication session (e.g., media session), as discussed above with regard to FIGS. 3A-3B. For example, the MESO component 310 may interface between services that fall within four distinct categories: media processing services 320, media routing services 330, session signaling services 340, and/or gateway services 350. In addition, FIG. 5 illustrates the MESO component 310 communicating with an endpoint registry 516, a simple notification service (SNS) dispatcher component 518, and/or a SIP bridge component 510.

For ease of illustration, FIG. 5 illustrates the media processing services 320 as including two skills (e.g., Skill 1 and Skill 2), with each skill having a single media processing unit (MPU) that each include two pipeline applications. For example, Skill 1 includes a first MPU 522 that includes a first pipeline application **524*a* and a second pipeline application 524*b*, while Skill 2 includes a second MPU 526 that includes a third pipeline application 528*a* and a fourth pipeline application 528*b*. However, the disclosure is not limited thereto and the media processing services 320 may include a plurality of skills, an individual skill may include any number of MPUs, and/or an individual MPU may include any number of pipeline applications without departing from the disclosure. For example, the first skill (e.g., Skill 1) may include a single MPU 522 or 3+ MPUs 522 without departing from the disclosure. Additionally or alternatively, the first MPU 522 may include a single pipeline application 524*a* or 3+ pipeline applications 524** without departing from the disclosure.

The MPUs 522/526 may perform media processing to enable additional functionality using the pipeline applications 524/528, as described in greater detail below with regard to FIGS. 11-12. Thus, the MPU 324 may receive first data and process the first data to generate second data. As part of performing media processing, the MPU 324 may perform speech processing on audio data and/or image data, perform computer vision processing on image data, modify audio data and/or image data, apply visual effects (e.g., overlay or other graphical element(s)) to image data, and/or the like to enable interesting functionality without departing from the disclosure. For example, the MPUs 522/526 may generate subtitles (e.g., text data) corresponding to speech represented in image data, may translate the subtitles to a different language, may perform text-to-speech processing to enable additional functionality (e.g., describing visual cues for someone that is visually impaired, replacing dialog with speech in a different language, etc.), may perform voice recognition to identify voices represented in audio data, may perform facial recognition to detect and/or identify faces represented in image data, may perform object recognition to detect and/or identify objects represented in image data, may add a graphical overlay to image data (e.g., censoring portions of the image data, adding symbols or cartoons to the image data, etc.), may perform other processing to media content (e.g., colorize black and white movies), and/or the like without departing from the disclosure.

As described in greater detail above, the media routing services 330 may include TURN/STUN servers 532 and may be configured to efficiently route data packets within the media transport system 125 and/or to external networks. For example, the media routing services 330 may include a control plane that coordinates between the TURN/STUN servers 532 to select an optimum route to send the data packets. Additionally or alternatively, the routing services 330 may apply machine learning models to further reduce latency by selecting the optimum route using non-geographical parameters (e.g., availability of servers, time of day, previous history, etc.).

As described in greater detail above, the session signaling services 340 (e.g., edge signaling, signaling network, etc.) may be configured to coordinate signal paths and/or a type of data packets sent between the devices 110 and server(s) within the media transport system 125. For example, the session signaling services 340 may enable the endpoints 570 (e.g., devices 110) to coordinate with each other to determine how data packets are sent between the endpoints 570. The session signaling services 340 may support protocols including Session Initiation Protocol (SIP), Real-Time Communication (RTC) protocol (e.g., WebRTC protocol), Alexa Voice Service (AVS) protocol, Extensible Messaging and Presence Protocol (XMPP), IP Multimedia Core Network Subsystem (IMS), H.323 standard, and/or the like, although the disclosure is not limited thereto.

As illustrated in FIG. 5, the session signaling services 340 may include proxy components 542 (e.g., proxy server(s)), such as a first proxy component **542*a*, a second proxy component 542*b*, and a third proxy component 542*c*. However, the disclosure is not limited thereto and a number of proxy components 542 may vary without departing from the disclosure. The proxy components 542 may interface with the endpoints 570 and enable the endpoints 570 to send requests to the media transport system 125**, initiate a communication session, and/or the like without departing from the disclosure.

While FIG. 5 illustrates the endpoint registry 516, the SNS dispatcher component 518, and the SIP bridge component 510 as separate components from the session signaling services 340, the disclosure is not limited thereto. In some examples, the endpoint registry 516, the SNS dispatcher component 518, and/or the SIP bridge component 510 may be associated with and/or included within the session signaling services 340 without departing from the disclosure.

The endpoint registry 516 may include a database of routing information associated with the endpoints 570 (e.g., devices 110). For example, the routing information may include network address(es), telephone number(s), and/or other information that enables the media transport system 125 to communicate with the endpoints 570.

The SNS dispatcher component 518 may correspond to a notification and/or messaging service that enables messaging functionality within the media transport system 125. Thus, the SNS dispatcher may enable a variety of messaging features, allowing the media transport system 125 to send messages to a large number of endpoints. For example, the SNS dispatcher component 518 may allow the mass delivery of messages to a variety of devices on different networks and/or platforms.

The SIP bridge component 510 may be used to translate between the SIP protocol and other signal protocols (e.g., internal command channels) used within the media transport system 125. For example, the SIP bridge component 510 may enable the media transport system 125 to be signaling protocol agnostic. The SIP bridge component 510, along with the gateway services 350, enables components associated with a control plane to communicate with other components that are associated with a signal plane and/or a data plane.

The control plane corresponds to internal command channels that are used to coordinate between components within the media transport system 125. As used herein, components associated with the control plane are represented using crosshatching, and control paths or control signals are represented using dotted lines. For example, the MESO component 310, the control plane component 512, the control plane component 514, the endpoint registry component 516, the SNS dispatcher component 518, and the SIP bridge 510 are represented using crosshatching to indicate that they are associated with the control plane, and control paths between these components are represented using dotted lines.

The signal plane corresponds to signaling between components used to coordinate connections and/or data routing. As used herein, components associated with the signal plane are represented as using light shading (e.g., light gray fill), and signal paths are represented using dashed lines. For example, the SIP bridge component 510, the proxy components 542, the gateway services 350, and external network components are associated with the signal plane and signal paths are represented using dashed lines.

The data plane corresponds to data paths along which data packets are sent between components during a communication session or the like. As used herein, components associated with the data plane are represented using heavy shading (e.g., dark gray fill), and data paths are represented using thick solid lines. For example, the pipeline applications 524/528, the TURN/STUN servers 532, and some of the external network components are associated with the data plane and the data paths used during a communication session are represented using thick solid lines.

Some components may be associated with two or more of the control plane, the signal plane, and the data plane. For example, the SIP bridge component 510 is associated with the control plane and the signal plane, which is indicated by crosshatching on one side and light shading on the other. Additionally or alternatively, external network components may be associated with the signal plane and the data plane, which is indicated by light shading on the top and dark shading on the bottom. For example, the carrier SBC component 558, the carrier network 566, the data network **564*b*, and the IP communication network 568 are represented using both the signal plane and the data plane. Thus, the media transport system 125 may send data packets to the carrier SBC component 558, the data network 564*b*, the carrier network 566, and/or the IP communication network 568**.

The PSTN **564*a* is represented without shading or crosshatching, indicating that the PSTN may not be configured to send and receive data packets (e.g., PSTN sends audio signals). However, some PSTN devices may be configured to send and receive data packets via the data network 564*b*, which is separate from the PSTN itself. Thus, the data network 564*b* corresponds to individual PSTN devices that have a PSTN telephone number and can be called via the PSTN but may also send and receive data packets using a separate data path via the data network 564*b*. For ease of explanation, the following drawings will combine the PSTN 564*a* and the data network 564*b*** into a single component.

As illustrated in FIG. 5, the MESO component 310 is represented as having dark shading and crosshatching, indicating that the MESO component 310 may be associated with the control plane, the signal plane, and/or the data plane without departing from the disclosure. However, the disclosure is not limited thereto and in some examples the MESO component 310 may be only associated with the control plane without departing from the disclosure.

The media transport system 125 (e.g., specifically the session signaling services 340 and/or the SIP bridge component 510) may interface with external networks using gateway services 350. For example, a portal gateway 552 may interface with social networking 562, a PSTN gateway 554 may interface with a PSTN network via data network component 564, a portal gateway 556 may interface with a carrier network 566 via a carrier session border controller (SBC) 558, and/or the like. While FIG. 5 illustrates examples of external networks and/or gateways, the disclosure is not limited thereto and the media transport system 125 may communicate with any external network known to one of skill in the art. Additionally or alternatively, while FIG. 5 illustrates the gateway services 350 as included in the media transport system 125, the disclosure is not limited thereto and the gateway services 350 and/or a portion of the gateway services 350 may be external to the media transport system 125. For example, the external networks may include one or more gateways without departing from the disclosure.

For ease of illustration, FIG. 5 illustrates an Internet Protocol (IP) communication network 568 as an external network. However, the IP communication network 568 may send and receive data packets using the same techniques and/or protocols as the media transport system 125. Thus, the media transport system 125 may directly interface with the IP communication network 568 without using the gateway services 350.

Figure 6A:
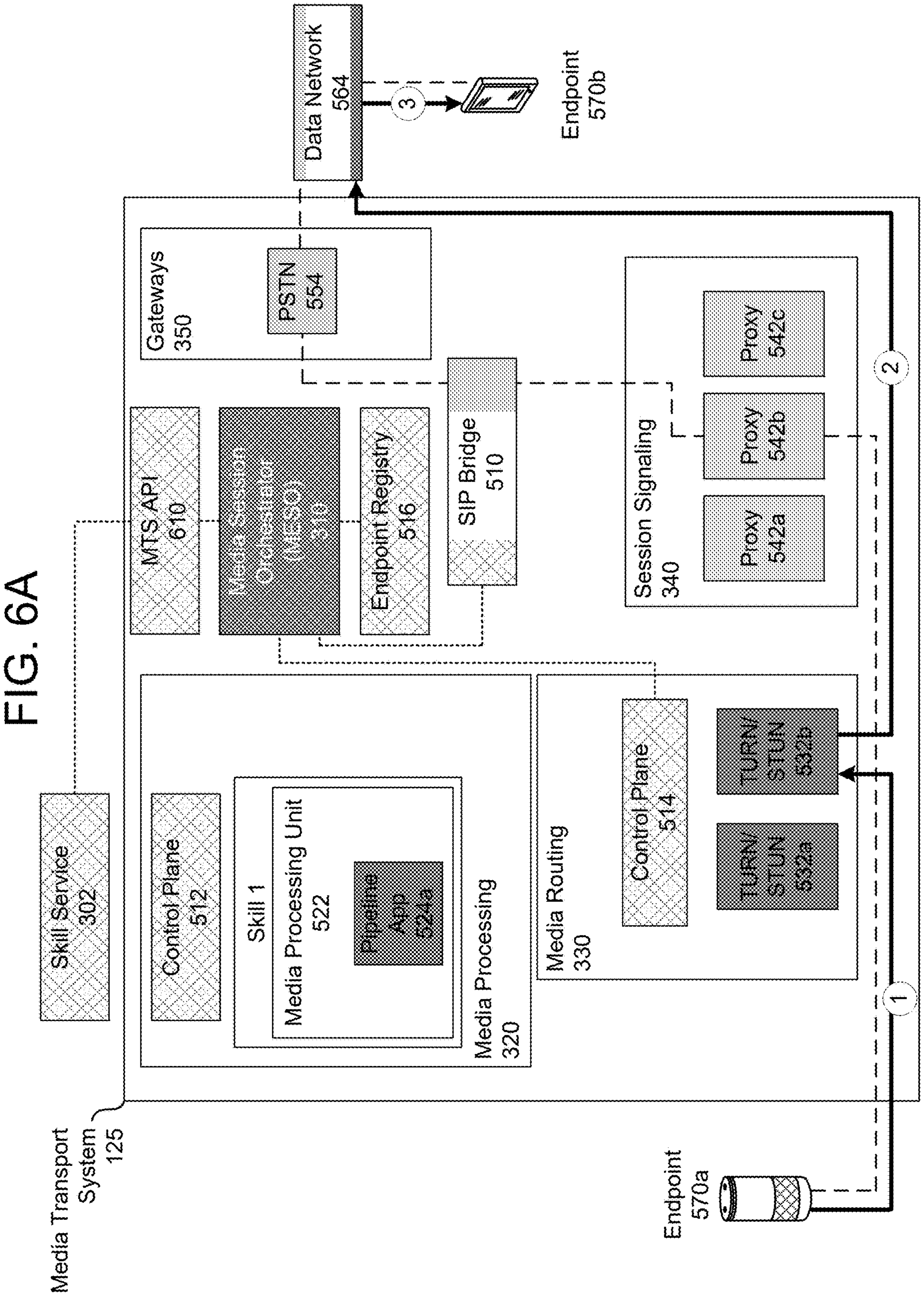
FIGS. 6A-6B illustrate examples of direct communication sessions that do not include media processing.
Figure 6B:
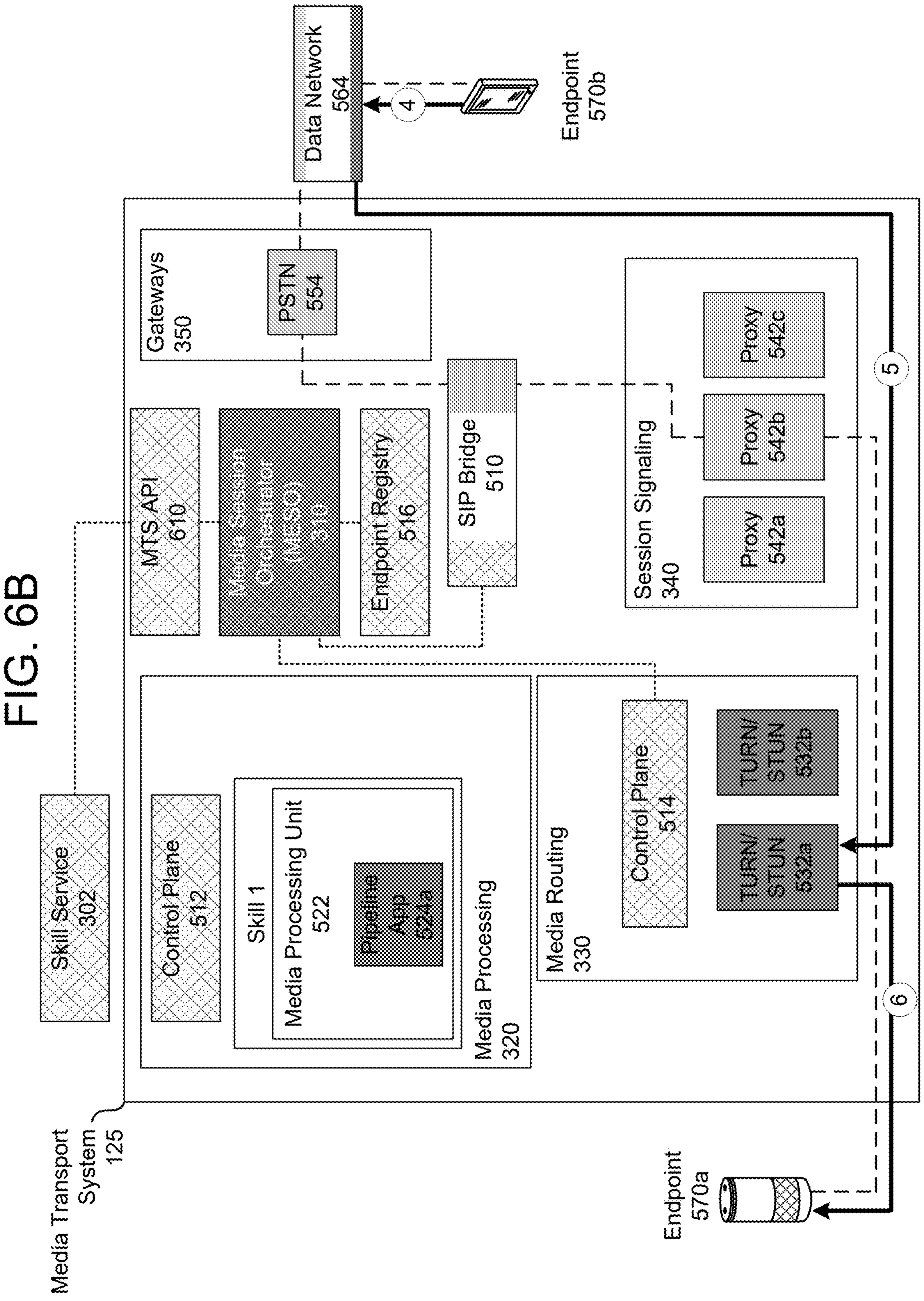

FIGS. 6A-6B illustrate examples of direct communication sessions that do not include media processing. For ease of explanation, redundant descriptions of components described above with regard to FIG. 5 are omitted. As illustrated in FIGS. 6A-6B, the media transport system 125 described above may include a media transport system application programming interface (MTS API) 360 configured to communicate with a skill service 302. As indicated by the patterned fill, the MTS API 360 and the skill service 302 may be part of the control plane associated with the media transport system 125. For example, the skill service 302 may send a request to the media transport system 125 via the MTS API 360 to initiate and/or manage a communication session between a first endpoint 570*a* and a second endpoint 570*b*. The MTS API 360 may receive the request from the skill service 302 and may send the request to the MESO component 310. In response to receiving the request, the MESO component 310 may initiate and manage the communication session between the first endpoint 570*a* and the second endpoint 570*b*.

In the examples illustrated in FIGS. 6A-6B, the communication session does not involve the media processing services 320. Therefore, the MESO component 310 does not communicate with the control plane component 512 and the first endpoint 570*a* and the second endpoint 570*b* may send and receive data through the media routing services 330.

As part of initiating the communication session, the session signaling services 340 may enable the first endpoint 570*a* to coordinate with the second endpoint 570*b*. For example, the first endpoint 570*a* and the second endpoint 570*b* may exchange data via the second proxy component 542*b*, the SIP bridge component 510, the PSTN gateway 554, and/or the data network component 564.

After the communication session is initiated, the first endpoint 570*a* and the second endpoint 570*b* may send and receive data. For example, FIG. 6A illustrates an example of the first endpoint 570*a* sending first data to a second TURN/STUN server 532*b* associated with the second endpoint 570*b* (step "1"), the second TURN/STUN server 532*b* sending the first data to the data network component 564 (step "2"), and the data network component 564 sending the first data to the second endpoint 570*b* (step "3"). Thus, the first endpoint 570*a* uses the second TURN/STUN server 532*b* and the data network component 564 to send the first data to the second endpoint 570*b*.

Similarly, FIG. 6B illustrates an example of the second endpoint 570*b* sending second data to the data network component 564 (step "4"), the data network component 564 sending the second data to a first TURN/STUN server 532*a* associated with the first endpoint 570*a* (step "5"), and the first TURN/STUN server 532*a* sending the second data to the first endpoint 570*a* (step "6"). Thus, the second endpoint 570*b* uses the data network component 564 and the first TURN/STUN server 532*a* to send the second data to the first endpoint 570*a*.

Figure 7A:
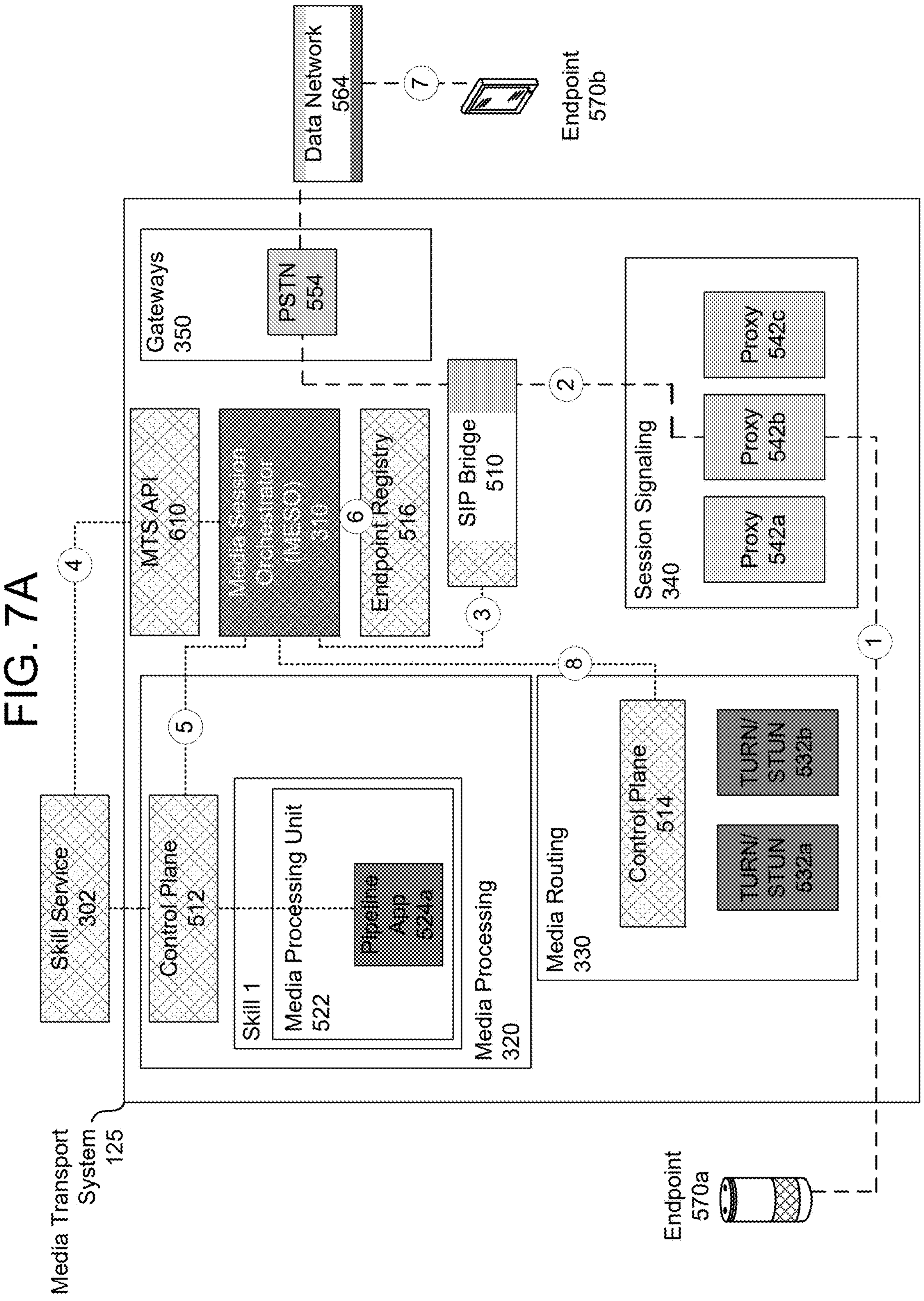
FIGS. 7A-7B illustrate examples of a communication session that includes media processing in two directions according to embodiments of the present disclosure.
Figure 7B:
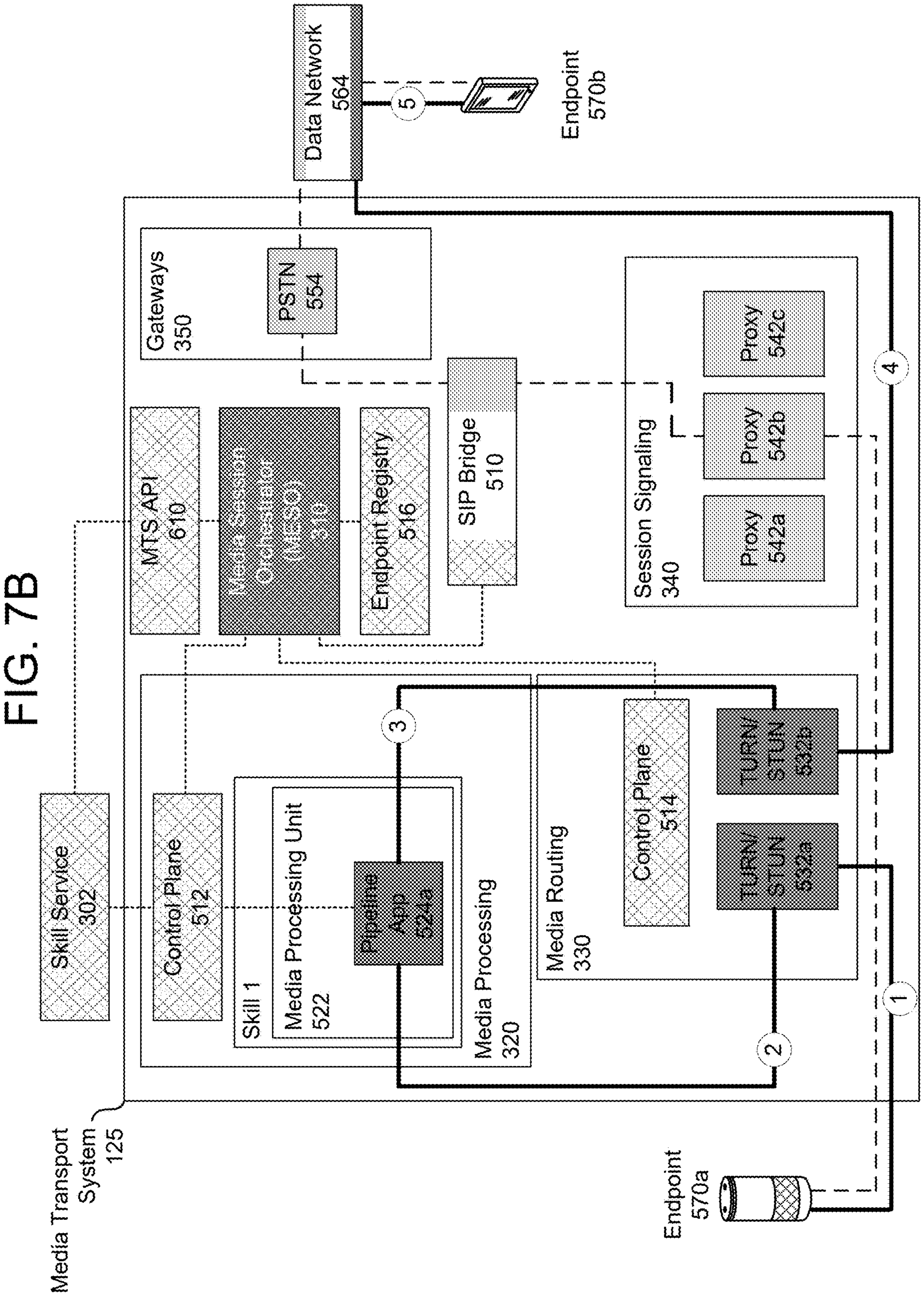

FIGS. 7A-7B illustrate examples of a communication session that includes media processing in two directions according to embodiments of the present disclosure. For example, the media processing services 320 may process first data sent from the first endpoint 570*a* to the second endpoint 570*b* and separately process second data sent from the second endpoint 570*b* to the first endpoint 570*a*.

In the example illustrated in FIGS. 7A-7B, the communication session involves the media processing services 320. Therefore, the MESO component 310 may communicate with the control plane component 512 as part of coordinating the communication session. In addition, the MESO component 310 may communicate with the control plane component 514, the endpoint registry 516, and/or the SIP bridge component 510.

As part of initiating the communication session, the session signaling services 340 may enable the first endpoint 570*a* to coordinate with the second endpoint 570*b*. For example, the first endpoint 570*a* and the second endpoint 570*b* may exchange data via the second proxy component 542*b*, the SIP bridge component 510, the PSTN gateway 554, and/or the data network component 564.

To initiate the communication session, the first endpoint 570*a* may generate a request that instructs the media transport system 125 to initiate and/or manage a communication session between the first endpoint 570*a* and the second endpoint 570*b*, with the media processing services 320 processing data flowing in both directions. As illustrated in FIG. 7A, the first endpoint 570*a* may send the request to a proxy component 542*b* (step "1") that forwards the request to the SIP bridge 510 (step "2"). The SIP bridge 510 may translate the request into an intent and send the request and/or intent to the MESO component 310 (step "3"). In addition, the SIP bridge 510 and/or the MESO component 310 may raise an event through the MTS API 360 to the skill service 302 (step "4"). While not illustrated in FIG. 7A, the skill service 302 may provide input regarding the communication session, such as what the event will look like and/or other parameters of the communication session to the MESO component 310 via the MTS API 360.

The MESO component 310 may identify a skill and/or media processing unit corresponding to the request (e.g., Skill 1 and MPU component 522) and send a message to the control plane component 512 with an instruction to start the pipeline application 524*a* associated with the MPU component 522 (step "5"). While not illustrated in FIG. 7A, the control plane component 512 may communicate with the MPU component 522 to prepare for the communication session. Additionally or alternatively, the control plane component 512 may also send information about the pipeline application 524*a* to the MESO component 310. This information may include codec information, an IP address, and/or other information relevant to enable other participants to connect to the pipeline application 524*a* as well.

In the example illustrated in FIG. 7A, the second endpoint 570*b* is associated with the PSTN. Thus, the MESO component 310 and/or the SIP bridge 510 may identify a PSTN telephone number or other routing information associated with the second endpoint 570*b* using the endpoint registry 516 (step "6"). However, the disclosure is not limited thereto and the media transport system 125 may determine routing information corresponding to the second endpoint 570*b* regardless of how the second endpoint 570*b* is connected to the media transport system 125 without departing from the disclosure.

The SIP bridge component 510 may use the PSTN telephone number (or other routing information) to send a communication session request to the second endpoint 570*b* via the PSTN gateway component 554 and the data network 564 (step "7"). The communication session request may notify the second endpoint 570*b* of an incoming communication session and may include the information about the communication session, the pipeline application 524*a*, and/or any other information associated with the communication session request.

While FIGS. 7A-7B illustrate examples of a communication session using a PSTN to directly communicate with the second endpoint 570*b* using a telephone number, the disclosure is not limited thereto. Instead, the system 100 may establish a communication session using any techniques known to one of skill in the art without departing from the disclosure. For example, the system 100 may communicate with the second endpoint 570*b* using the telephone number via a cellular connection (e.g., mobile phone network) without departing from the disclosure. Additionally or alternatively, the system 100 is not limited to a telephone number, the PSTN, and/or a cellular connection and may establish and terminate a communication session using any connection and/or network known to one of skill in the art without departing from the disclosure. For example, the system 100 may communicate with the second endpoint 570*b* using an internet protocol (IP) address associated with the second endpoint 570*b* without departing from the disclosure.

While not illustrated in FIG. 7A, the second endpoint 570*b* may receive the communication session request and notify a second user 5*b* of the second endpoint 570*b* of the request. For example, the second endpoint 570*b* may "ring" by outputting audio and/or displaying a graphical interface indicating the communication session request. In some examples, the second endpoint 570*b* may send a first notification that the second endpoint 570*b* is ringing back to the media transport system 125. If the second user 5*b* decides to accept the communication session request, the second endpoint 570*b* may send a second notification that the communication session request was accepted (e.g., answered) to the media transport system 125. These notifications may be sent to the media transport system 125 via the SIP bridge component 510, and the SIP bridge component 510 may send an event to the MESO component 310 indicating that the communication session is established. The SIP bridge component 510, either directly or via the MESO component 310, may also send data to the skill service 302 to indicate that the communication session request was accepted.

To coordinate data routing, the MESO component 310 may send an instruction to the control plane component 514 to request that the media routing services 330 route data packets during the communication session (step "8"). For example, the MESO component 310 may request that the first TURN/STUN server 532*a* route data between the first endpoint 570*a* and the pipeline application 524*a* and that the second TURN/STUN server 532*b* route data between the pipeline application 524*a* and the second endpoint 570*b*. In some examples, the MESO component 310 may send detailed routing information that identifies how the media routing services 330 should route the data during the communication session. However, the disclosure is not limited thereto and the MESO component 310 may send an instruction that identifies the routing information (e.g., IP addresses and/or the like) associated with the first endpoint 570*a*, the second endpoint 570*b*, and/or the pipeline application 524*a* and the media routing services 630 may determine how to route the data independently.

While FIG. 7A illustrates the first endpoint 570*a* sending the request directly to the media transport system 125, the disclosure is not limited thereto. In some examples, the skill service 302 may send the request to the media transport system 125 via the MTS API 360. The MTS API 360 may receive the request from the skill service 302 and may send the request to the MESO component 310. In response to receiving the request, the MESO component 310 may initiate and manage the communication session between the first endpoint 570*a* and the second endpoint 570*b*.

After the communication session is initiated, the first endpoint 570*a* and the second endpoint 570*b* may send and receive data using a media pipeline routed through the media processing services 320 and the media routing services 330. For example, FIG. 7B illustrates an example of the first endpoint 570*a* sending first data to the first TURN/STUN server 532*a* associated with the first endpoint 570*a* (step "1"), the first TURN/STUN server 532*a* sending the first data to the pipeline application 524*a* in the media processing unit 522 (step "2"), the pipeline application 524*a* processing the first data to generate second data and sending the second data to the second TURN/STUN server 532*b* associated with the second endpoint 570*b* (step "3"), the second TURN/STUN server 532*b* sending the second data to the data network component 564 (step "4"), and the data network component 564 sending the second data to the second endpoint 570*b* (step "5").

While not illustrated in FIG. 7B, the second endpoint 570*b* may send third data to the first endpoint 570*a* using the same media pipeline (e.g., routing information) in the opposite direction. For example, the second endpoint 570*b* may send the third data to the data network component 564, the data network component 564 may send the third data to the second TURN/STUN server 532*b*, the second TURN/STUN server 532*b* may send the third data to the pipeline application 524*a*, the pipeline application 524*a* may process the third data to generate fourth data and send the fourth data to the first TURN/STUN server 532*a*, and the first TURN/STUN server 532*a* may send the fourth data to the first endpoint 570*a*.

As the example illustrated in FIGS. 7A-7B illustrates the second endpoint 570*b* being connected to the PSTN and communicating with the media transport system 125 via the data network 564 and/or the PSTN gateway component 554, the media transport system 125 may be performing media processing on audio data and sending the processed audio data to the second endpoint 570*b*. For example, the media transport system 125 may send the processed audio data to the second endpoint 570*b* via the data network 564. Additionally or alternatively, the media transport system 125 may send the processed audio data to the PSTN gateway component 554 and the PSTN gateway component 554 may send the processed audio data to the second endpoint 570*b* via the PSTN. However, the disclosure is not limited thereto and the media transport system 125 may also send processed image data to the second endpoint 570*b* without departing from the disclosure. For example, the second endpoint 570*b* may be connected to a data network without using the gateway services 350 and may send data to and receive data from the media transport system 125 based on an IP address without departing from the disclosure.

Figure 7C:
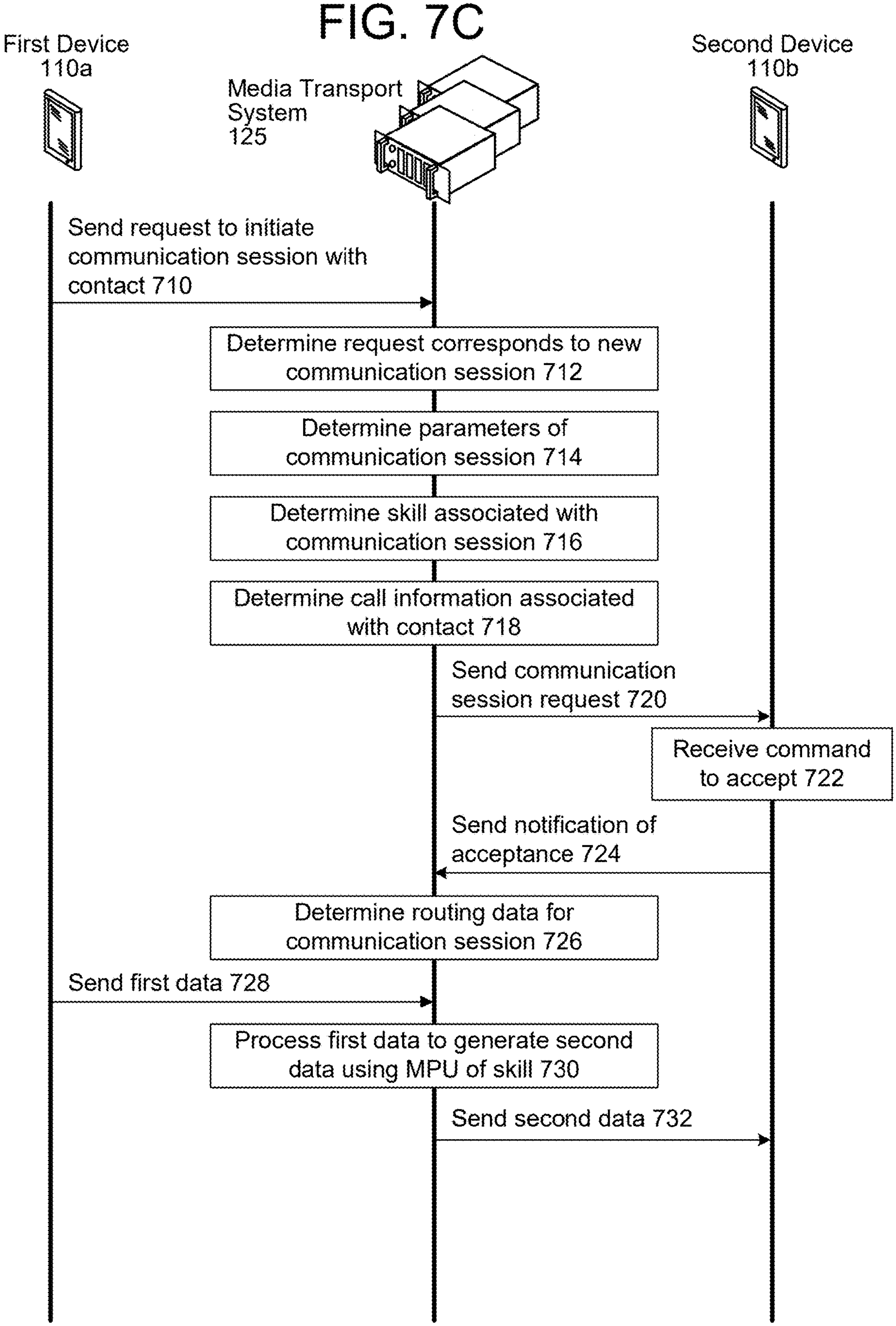
FIG. 7C is a process flow diagram conceptually illustrating an example of initiating a communication session and performing media processing according to embodiments of the present disclosure.

FIG. 7C is a process flow diagram conceptually illustrating an example of initiating a communication session and performing media processing according to embodiments of the present disclosure. As illustrated in FIG. 7C, a first device 110*a* may send (710) a request to initiate a communication session with a contact to the media transport system 125. The media transport system 125 may determine (712) that the request corresponds to a new communication session, may determine (714) parameters of the communication session, may determine (716) a skill associated with the communication session (e.g., a particular MPU component), and may determine (718) call information associated with the contact. For example, the request may indicate a name associated with a contact to call and the media transport system 125 may identify a particular contact that corresponds to the name in contact data associated with the first device 110*a*.

In some examples, the media transport system 125 may send (720) a communication session request to a second device 110*b*. However, the disclosure is not limited thereto and the media transport system 125 may send an instruction to send the communication session request to the first device 110*a* and/or the first device 110*a* may send the communication session request to the second device 110*b* without departing from the disclosure. The second device 110*b* may receive (722) a command to accept the communication session request and may send (724) a notification of acceptance to the media transport system 125. For example, the second device 110*b* may display a notification of the communication session request and may receive authorization from a user of the second device 110*b* to accept the communication session request.

The media transport system 125 may then determine (726) routing data for the communication session. Using the routing data, the first device 110*a* may send (828) first data to the media transport system 125, the media transport system 125 may process (730) the first data to generate second data using an MPU associated with the skill, and the media transport system 125 may send (732) the second data to the second device 110*b*. While FIG. 7C illustrates the first device 110*a* initiating an outbound communication session (e.g., call), the disclosure is not limited thereto and the first device 110*a* may receive an inbound communication session request without departing from the disclosure.

While FIG. 7C illustrates the first device 110*a* sending the request directly to the media transport system 125, the disclosure is not limited thereto. In some examples, the first device 110*a* may send the request, audio data representing the request, and/or other data to the media transport system 125 via the remote system 120. For example, the remote system 120 may receive input data from the first device 110*a*, may interpret the input data to determine the request, and may send the request to the media transport system 125 without departing from the disclosure. To illustrate an example, the remote system 120 may determine that the audio data corresponds to a voice command of "call Mom" and may send an instruction to the media transport system 125 instructing the media transport system 125 to initiate a communication session with a contact named "Mom." Additionally or alternatively, the first device 110*a* may send the request to the media transport system 125 via the skill service 302 without departing from the disclosure.

While the example described above refers to the communication session including media processing in both directions (e.g., two-way audio or video chat), the disclosure is not limited thereto. Instead, the media transport system 125 may perform media processing in only one direction, such as processing data sent from the first endpoint 570*a* to the second endpoint 570*b* without the first endpoint 570*a* receiving data from the second endpoint 570*b*, or vice versa, without departing from the disclosure. A single-direction communication session between endpoints 570 (e.g., one-way calling) may occur between a first user 5*a* and a second user 5*b*, between a first device and a second device that are both associated with the first user 5*a* (e.g., security camera or remote monitoring implementation), and/or the like.

Figure 8A:
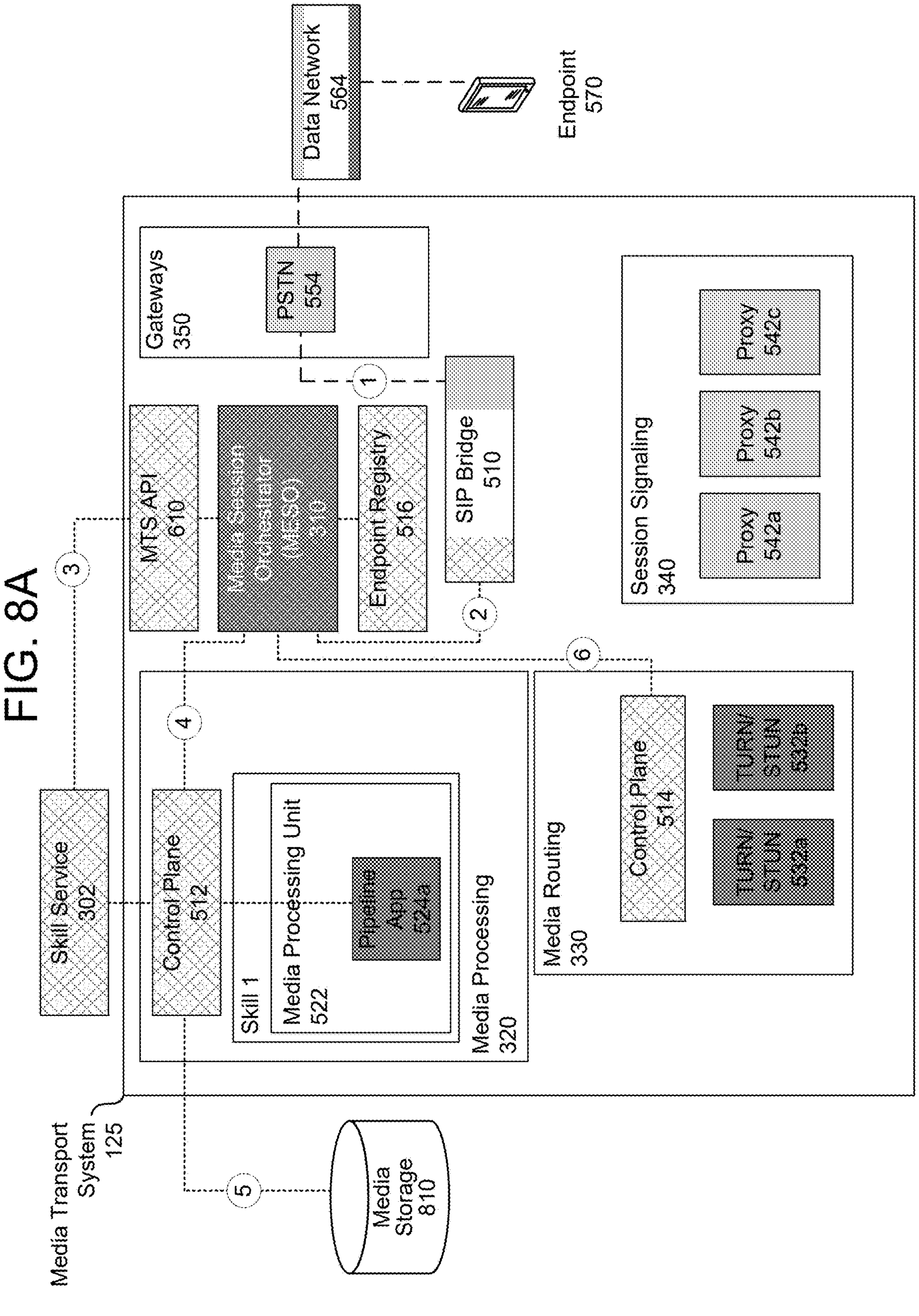
FIGS. 8A-8B illustrate examples of a communication session that includes media processing in one direction according to embodiments of the present disclosure.
Figure 8B:
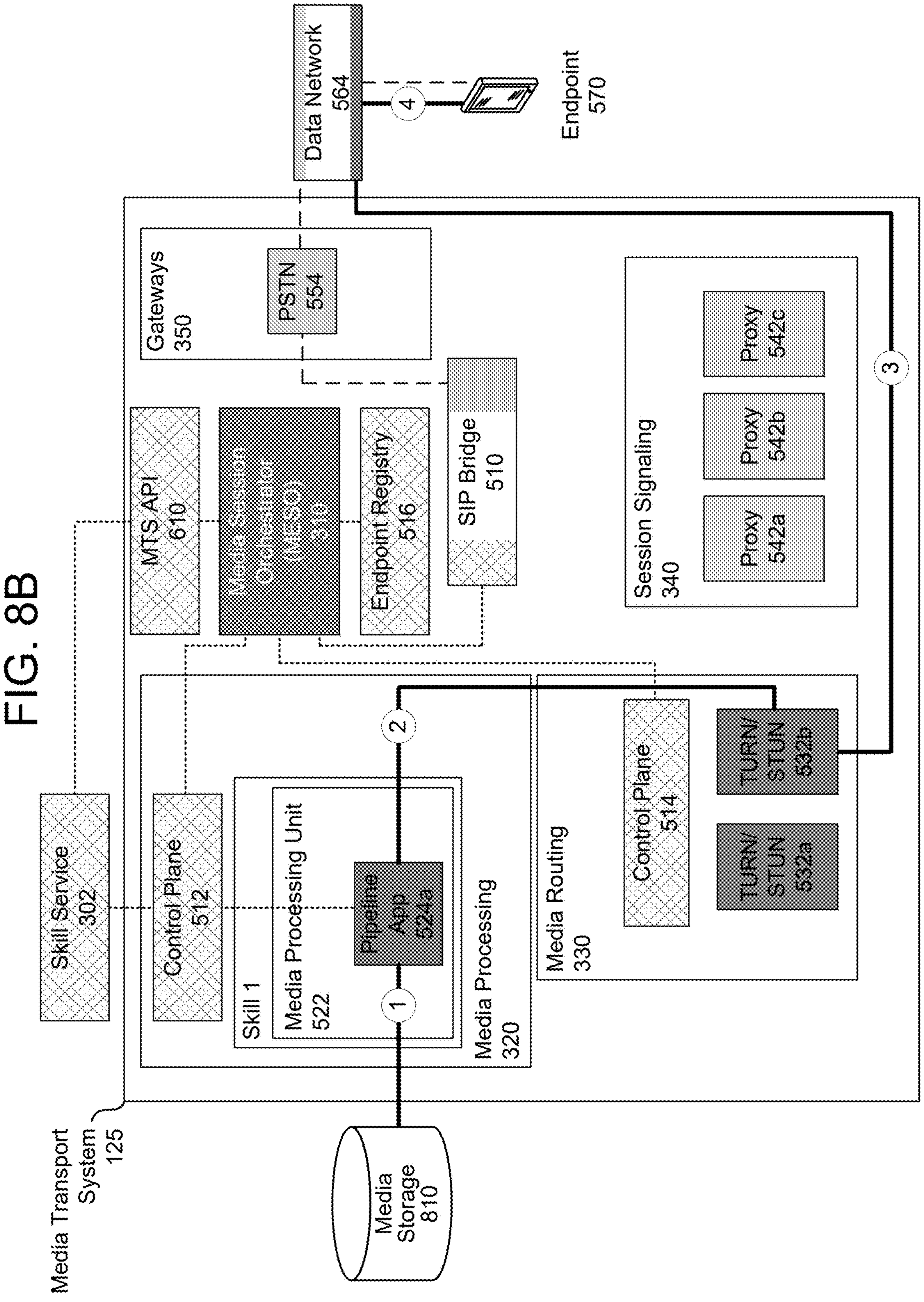

FIGS. 8A-8B illustrate examples of a communication session that includes media processing in one direction according to embodiments of the present disclosure. In the example illustrated in FIGS. 8A-8B, the data being processed originates from a media storage component 810 and is sent to an endpoint 570. For example, the media storage component 810 may correspond to a voicemail system and the media transport system 125 may enable media processing functionality to the voicemail system. Thus, the media storage component 810 may correspond to a database that is external to the media transport system 125, a database that is included within the media transport system 125, and/or a database associated with the endpoint 570 without departing from the disclosure.

As discussed above, the MESO component 310 may communicate with the control plane component 512, the control plane component 514, the endpoint registry 516, and/or the SIP bridge component 510 to coordinate the communication session. To initiate the communication session, the endpoint 570 may communicate with the SIP bridge component 510 via the PSTN gateway component 554 and the data network 564. If the endpoint 570 was not connected to an external network like the PSTN, the endpoint 570 may instead communicate with the SIP bridge component 510 via the proxy component 542 as described above with regard to the first endpoint 570*a*.

To initiate the communication session, the endpoint 570 may generate a request that instructs the media transport system 125 to initiate and/or manage a communication session, with the media processing services 320 processing data flowing in a single direction. As illustrated in FIG. 8A, the endpoint 570 may send the request to the SIP bridge component 510 via the PSTN gateway component 554 (step "1"). The SIP bridge 510 may translate the request into an intent and send the request and/or intent to the MESO component 310 (step "2"). In addition, the SIP bridge 510 and/or the MESO component 310 may raise an event through the MTS API 360 to the skill service 302 (step "3"). While not illustrated in FIG. 8A, the skill service 302 may provide input regarding the communication session, such as what the event will look like and/or other parameters of the communication session to the MESO component 310 via the MTS API 360.

While FIG. 8A illustrates the endpoint 570 sending the request directly to the media transport system 125, the disclosure is not limited thereto. In some examples, the skill service 302 may send the request to the media transport system 125 via the MTS API 360. For example, the MTS API 360 may receive the request from the skill service 302 and may send the request to the MESO component 310.

The MESO component 310 may identify a skill and/or media processing unit corresponding to the request (e.g., Skill 1 and MPU component 522) and send a message to the control plane component 512 with an instruction to start the pipeline application 524*a* associated with the MPU component 522 (step "4"). While not illustrated in FIG. 8A, the control plane component 512 may communicate with the MPU component 522 to prepare for the communication session. Additionally or alternatively, the control plane component 512 may also send information about the pipeline application 524*a* to the MESO component 310. This information may include codec information, an IP address, and/or other information associated with the communication session. The MESO component 310 and/or the control plane component 512 may also send data to the media storage component 810 instructing the media storage component 810 to provide requested media content indicated by the request (e.g., audio data corresponding to voicemail) (step "5").

To coordinate data routing, the MESO component 310 may send an instruction to the control plane component 514 to request that the media routing services 330 route data packets during the communication session (step "6"). For example, the MESO component 310 may request that the second TURN/STUN server 532*b* route data between the pipeline application 524*a* and the endpoint 570.

After the communication session is initiated, the media storage component 810 may send media content to the endpoint 570 using a media pipeline routed through the media processing services 320 and the media routing services 330. For example, FIG. 8B illustrates an example of the media storage component 810 sending first data to the pipeline application 524*a* in the media processing unit 522 (step "1"), the pipeline application 524*a* processing the first data to generate second data and sending the second data to the second TURN/STUN server 532*b* associated with the endpoint 570 (step "2"), the second TURN/STUN server 532*b* sending the second data to the data network component 564 (step "3"), and the data network component 564 sending the second data to the endpoint 570 (step "4"). However, the disclosure is not limited thereto and the second TURN/STUN server 532*b* may send the second data directly to the endpoint 570 and/or to the endpoint 570 via the PSTN gateway component 554 without departing from the disclosure.

In some examples, the media storage component 810 may send the first data to the pipeline application 524*a* via a TURN/STUN server 532, as described above with regard to the first endpoint 570*a*. For example, the media storage component 810 may not be on the media transport system 125 and/or may not share a network with the media processing unit 522.

While FIGS. 8A-8B illustrate an example of the endpoint 570 being connected to an external network and interfacing with the media transport system 125 via the data network component 564, this is for ease of illustration only and the disclosure is not limited thereto. Instead, the endpoint 570 may be connected directly to the second TURN/STUN server 532*b* (e.g., separately from the data network component 564) without departing from the disclosure. Additionally or alternatively, the endpoint 570 may be connected to the media transport system 125 using the gateway services 350 and/or using any techniques known to one of skill in the art without departing from the disclosure.

Figure 9A:
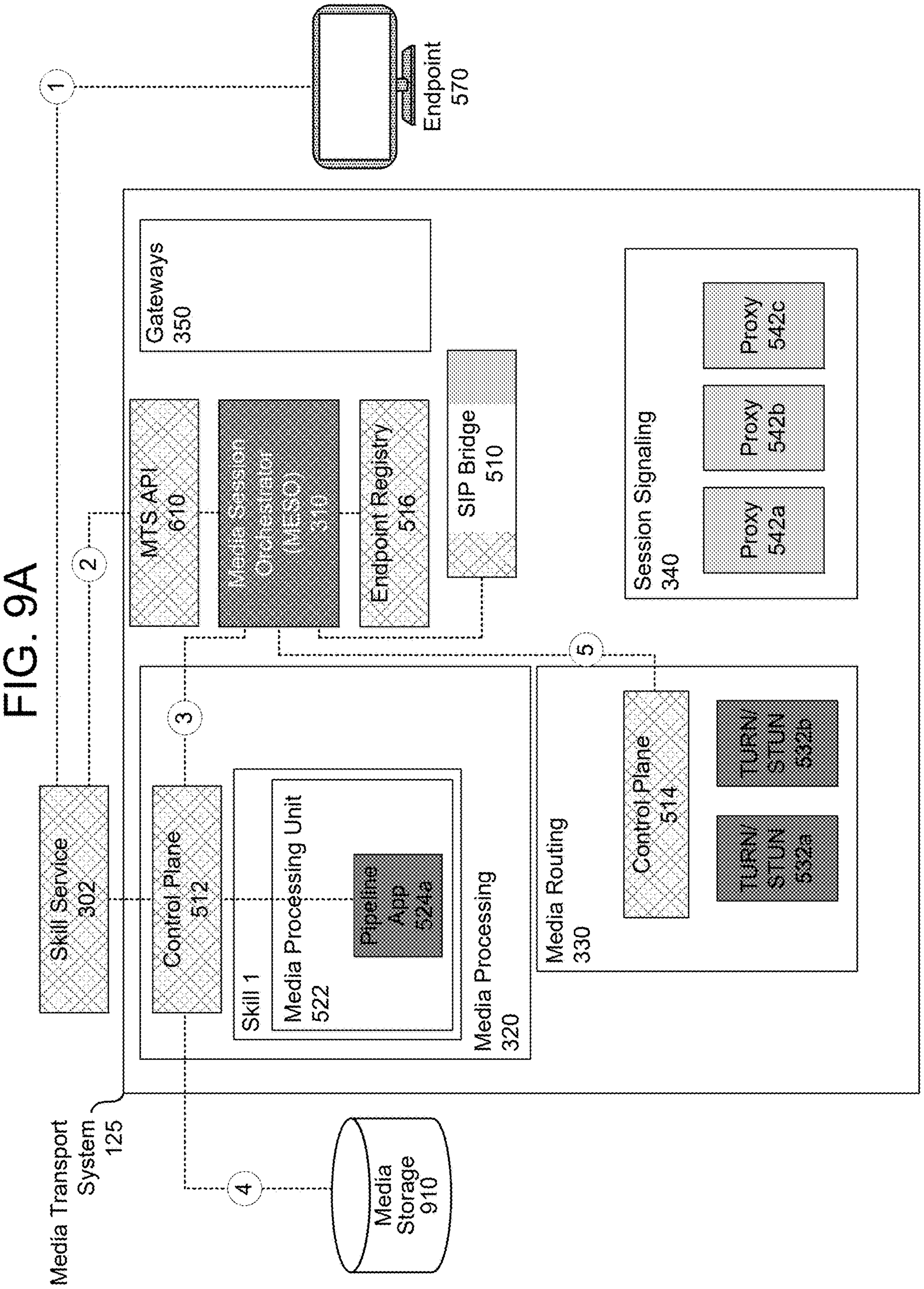
FIGS. 9A-9B illustrate examples of a communication session that includes media processing in one direction according to embodiments of the present disclosure.
Figure 9B:
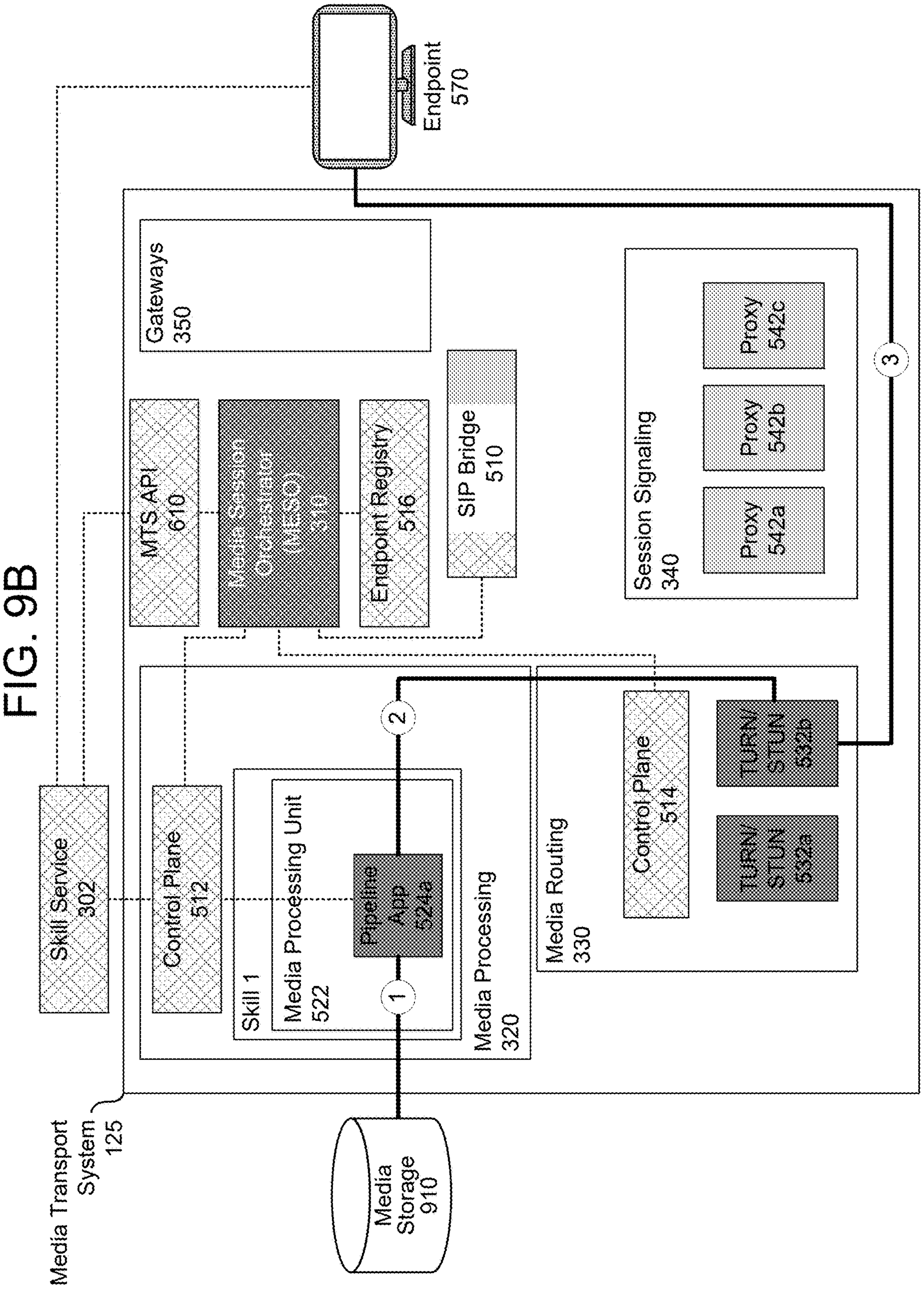

FIGS. 9A-9B illustrate examples of a communication session that includes media processing in one direction according to embodiments of the present disclosure. In the example illustrated in FIGS. 9A-9B, the data being processed originates from a media storage component 910 and is sent to an endpoint 570 (e.g., video streaming implementation). The media storage component 910 may correspond to a database that is external to the media transport system 125, a database that is included within the media transport system 125, and/or a database associated with the endpoint 570 without departing from the disclosure.

As discussed above, the MESO component 310 may communicate with the control plane component 512, the control plane component 514, the endpoint registry 516, and/or the SIP bridge component 510 to coordinate the communication session. To initiate the communication session, the endpoint 570 may communicate with the SIP bridge component 510 via the PSTN gateway 554 and the data network component 564. If the endpoint 570 was not connected to an external network, the endpoint 570 may instead communicate with the SIP bridge component 510 via the proxy component 542 as described above with regard to the first endpoint 570*a*.

To initiate the communication session, the endpoint 570 (e.g., television, smart device connected to the television, etc.) may generate a request that instructs the media transport system 125 to initiate and/or manage a communication session, with the media processing services 320 processing data flowing in a single direction. As illustrated in FIG. 9A, the endpoint 570 may send the request to the skill service 302 (step "1"). The skill service 302 may send the request to the MESO component 310 (step "2") via the MTS API 610.

The MESO component 310 may identify a skill and/or media processing unit corresponding to the request (e.g., Skill 1 and MPU component 522) and send a message to the control plane component 512 with an instruction to start the pipeline application 524*a* associated with the MPU component 522 (step "3"). While not illustrated in FIG. 9A, the control plane component 512 may communicate with the MPU component 522 to prepare for the communication session. Additionally or alternatively, the control plane component 512 may also send information about the pipeline application 524*a* to the MESO component 310. This information may include codec information, an IP address, and/or other information associated with the communication session. The MESO component 310 and/or the control plane component 512 may also send data to a media storage component 910 instructing the media storage component 910 to provide requested media content indicated by the request (step "4").

To coordinate data routing, the MESO component 310 may send an instruction to the control plane component 514 to request that the media routing services 330 route data packets during the communication session (step "5"). For example, the MESO component 310 may request that the second TURN/STUN server 532*b* route data between the pipeline application 524*a* and the endpoint 570.

After the communication session is initiated, the media storage component 910 may send media content to the endpoint 570 using a media pipeline routed through the media processing services 320 and the media routing services 330. For example, FIG. 9B illustrates an example of the media storage component 910 sending first data to the pipeline application 524*a* in the media processing unit 522 (step "1"), the pipeline application 524*a* processing the first data to generate second data and sending the second data to the second TURN/STUN server 532*b* associated with the endpoint 570 (step "2"), and the second TURN/STUN server 532*b* sending the second data to the endpoint 570 (step "3").

In some examples, the media storage component 910 may send the first data to the pipeline application 524*a* via a TURN/STUN server 532, as described above with regard to the first endpoint 570*a*. For example, the media component storage 910 may not be on the media transport system 125 and/or may not share a network with the media processing unit 522.

FIG. 10 illustrates examples of potential processing that can be performed by a media processing unit according to embodiments of the present disclosure. As illustrated in FIG. 10, the system 100 may receive image data 1010 and/or audio data 1020. As part of performing media processing, the system 100 may perform input processing 1030 on the image data 1010 and/or the audio data 1020. For example, the input processing 1030 may correspond to performing computer vision processing (e.g., facial recognition, object recognition, etc.) on the image data 1010 and/or performing speech processing or voice recognition on the audio data 1020.

The media processing services 310 may modify existing media content and/or generate new media content using a variety of techniques known to one of skill in the art. For example, media generation 1040 may insert visual effects, modify existing image data, insert audio signals, and/or modify existing audio data. Thus, the media processing services 310 may modify image data by adding graphical elements and/or adjusting the existing image data, and may modify audio data by adding audio signals and/or adjusting the existing audio data. The media generation 1040 may generate processed data 1050, which may correspond to graphical overlay(s), text overlay(s), audiovisual (A/V) filtering, video colorization, live transcriptioning, closed captioning, translation, text-to-speech (TTS) processing, annotation of visual cues (e.g., for the visually impaired), and/or the like.

Figure 11:
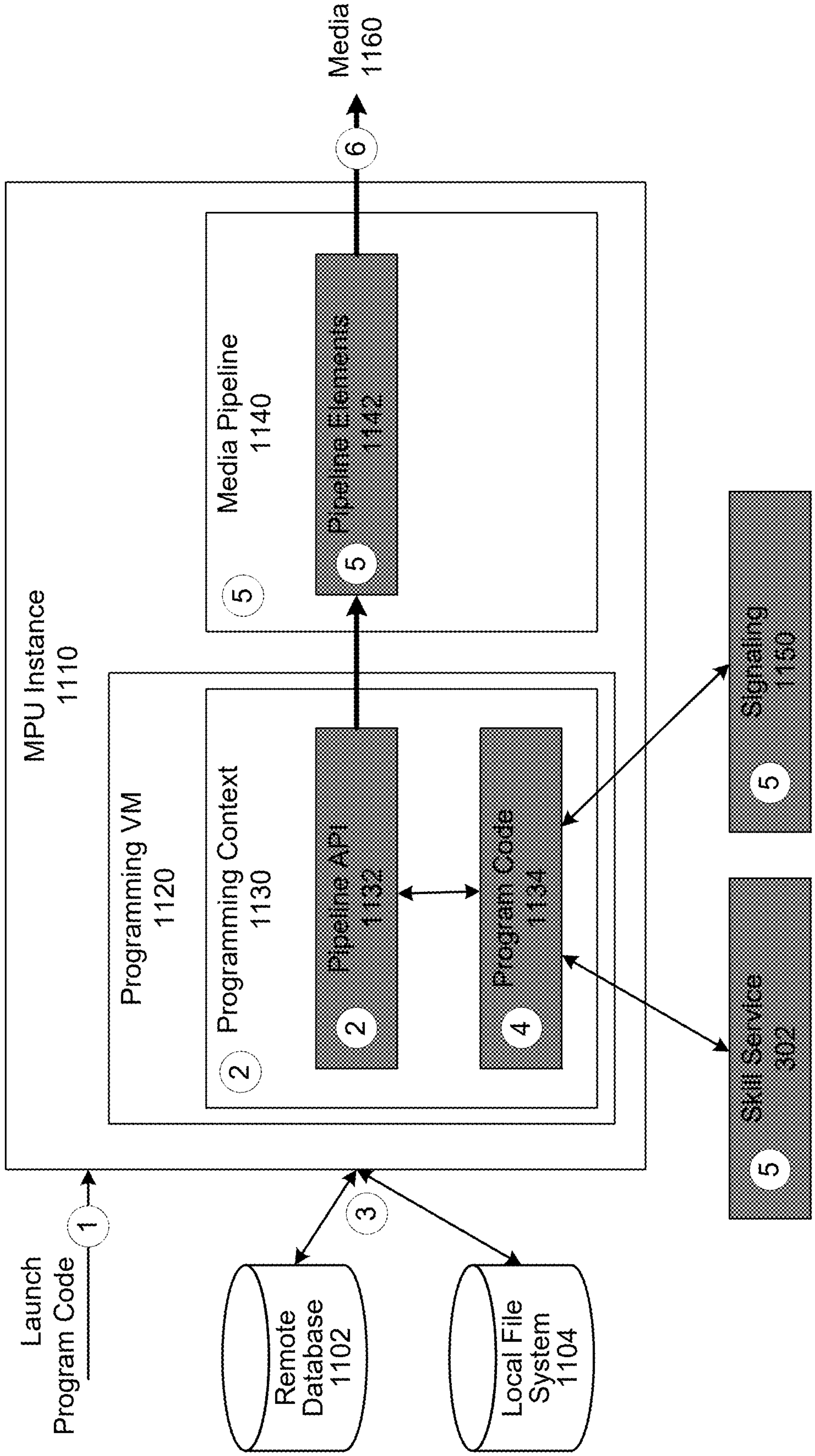
FIG. 11 illustrates an example component diagram of a media processing unit according to embodiments of the present disclosure.

FIG. 11 illustrates an example component diagram of a media processing unit according to embodiments of the present disclosure. As illustrated in FIG. 11, a media processing unit (e.g., MPU 522) may include a MPU instance 1110 configured to perform media processing. The media processing is typically performed within a single MPU instance 1110, such that the MESO component 310 routes triggers, events, or any other changes to the communication session to the same MPU instance 1110 for a particular communication session.

As used herein, the MPU instance 1110 may refer to a specific component that is executing program code; all of the logic associated with the media processing unit is running in memory in a single host, which decreases latency associated with the media processing. For example, conventional techniques for executing asynchronous workflows perform checkpointing to store data in storage components between events. Thus, when a new event occurs, the conventional techniques retrieve the stored session and loads data into the memory, resulting in a large amount of latency. As part of reducing the latency, the media transport system 125 may use the MESO component 310 to route triggers and events directly to the MPU instance 1110 that is performing the media processing, enabling the media transport system 125 to perform media processing in real-time.

To illustrate an example of performing media processing, the MPU instance 1110 may receive a request to launch a particular program code 1134 (e.g., pipeline file) (step "1"). The MPU instance 1110 may create a new programming context 1130 within a programming virtual machine (VM) 1120 (step "2") and inject pipeline application programming interface (API) functions 1132 into the programming context 1130. In addition, the MPU instance 1110 may retrieve the program code 1134 from a remote database 1102 and/or local file system 1104 (step "3") and load the program code 1134 into the programming context 1130 (step "4"). For example, the MPU instance 1110 may receive a request to launch a particular JavaScript file and may generate a Javascript context (using a Javascript Virtual Machine) that includes the pipeline API 1132 and the Javascript file (e.g., program code 1134).

The programming VM 1120 can communicate with the skill service and/or signaling 1150 and may create a media pipeline 1140 and pipeline elements 1142 (step "5"). Once the pipeline has been set up, the MPU instance 1110 may send media content through the media pipeline 1140 to whatever endpoint devices are included in the communication session.

As illustrated in FIG. 11, the system 100 enables developers to create media-focused applications using existing programming languages and development tools. The system 100 may also enable developers to deploy, instantiate, and run instances of the applications in run-time containers located on the media transport system 125. The run-time containers benefit from hardware located within the media transport system 125, enabling developers to pay for the resources that the applications use and the network input/output passing through the media transport system 125.

Figure 12:
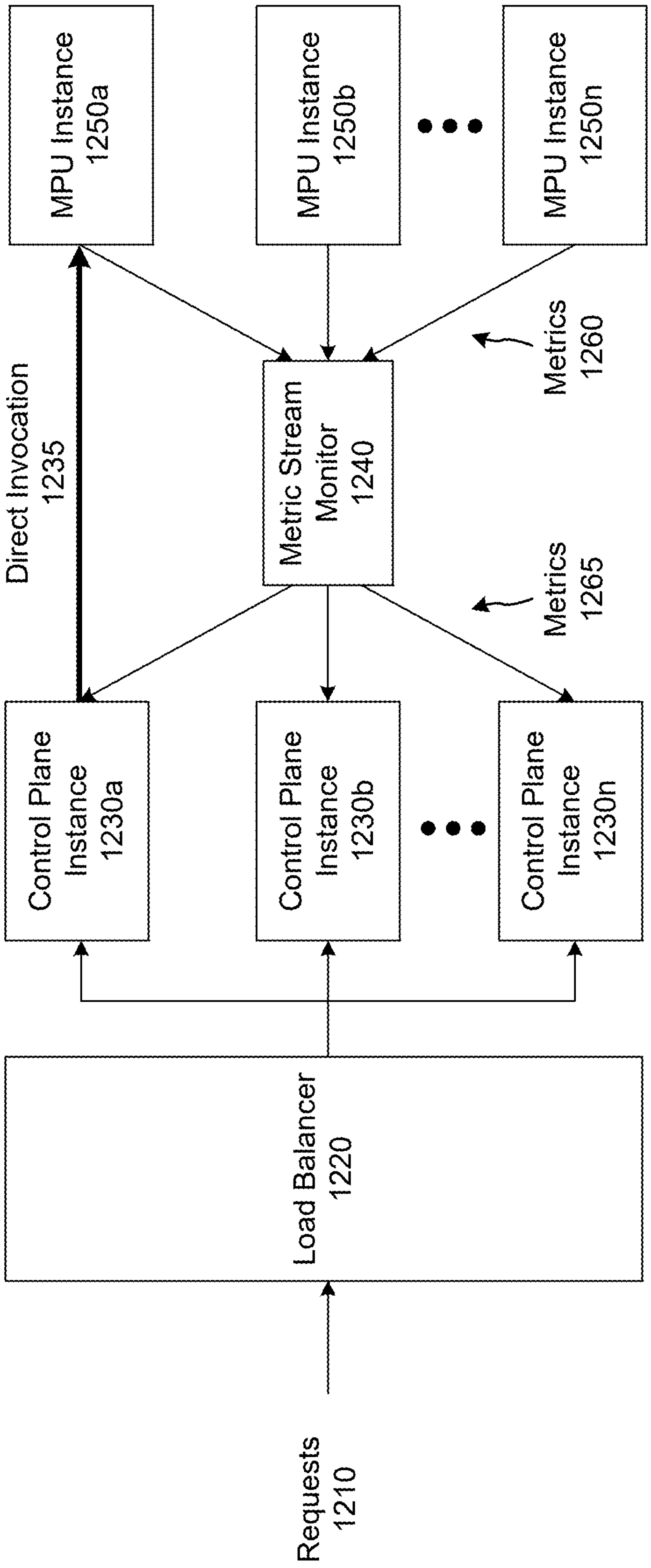
FIG. 12 illustrates an example component diagram of invoking a media processing unit instance according to embodiments of the present disclosure.

FIG. 12 illustrates an example component diagram of invoking a media processing unit instance according to embodiments of the present disclosure. As illustrated in FIG. 12, the system 100 may input requests 1210 to a load balancer 1220 that may send individual requests 1210 to a Control Plane instance 1230. For example, FIG. 12 illustrates a plurality of control plane instances 1230*a*-1230*n*. An individual control plane instance 1230 may select a single media processing unit (MPU) instance 1250 using direct invocation 1235. For example, FIG. 12 illustrates a first control plane instance 1230*a* performing direct invocation 1235 to select a first MPU instance 1250*a*.

To improve load balancing and perform other optimization, the system 100 may include a metric stream monitor 1240 that may receive first metrics 1260 from the MPU instances 1250 and may send second metrics 1265 to the control plane instances 1230.

Figure 13:
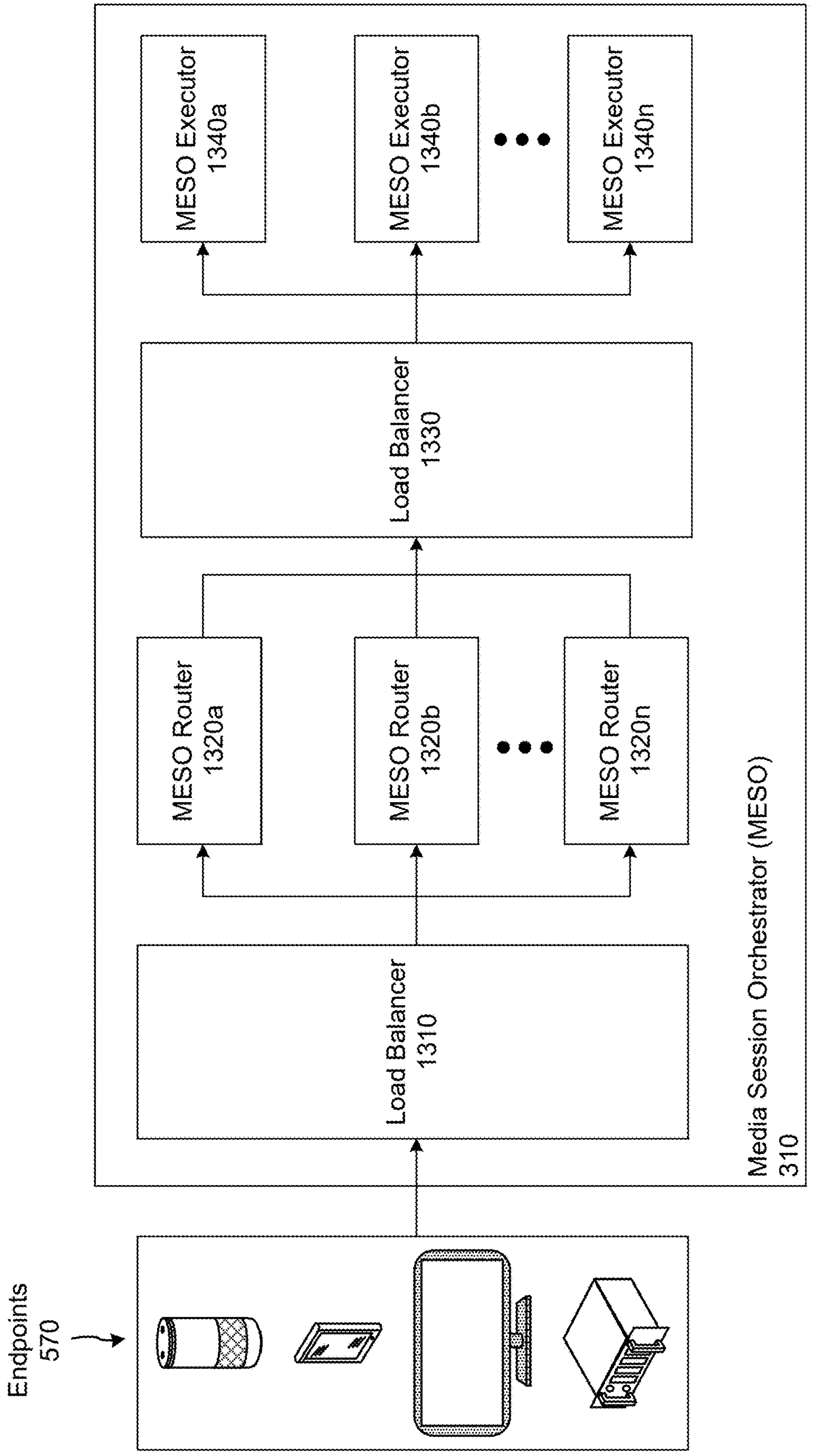
FIG. 13 illustrates an example component diagram of a media session orchestrator according to embodiments of the present disclosure.

FIG. 13 illustrates an example component diagram of a media session orchestrator according to embodiments of the present disclosure. As illustrated in FIG. 13, individual endpoints 570 may send requests to the media session orchestrator (MESO) component 310. To process the requests, the MESO component 310 may include a first load balancer 1310, a plurality of MESO router components 1320 (e.g., 1320*a*-1320*n*), a second load balancer 1330, and a plurality of MESO executor components 1340 (e.g., 1340*a*-1340*n*).

To illustrate an example, the first load balancer 1310 may receive a request from a first endpoint 570*a* and may send the request to an available MESO router component 1320, such as a first MESO router component 1320*a*. If the request corresponds to a new workflow (e.g., initiating a new communication session), the first MESO router component 1320*a* may use the second load balancer 1330 to randomly select an available MESO executor component to run the workflow (e.g., workflow instance). For example, the first MESO router component 1320*a* may select a first MESO executor component 1340*a* to run the new workflow corresponding to the incoming request.

If the request corresponds to an existing workflow (e.g., modifying an existing communication session), the MESO router component 1320 may determine that the request corresponds to an event raised against a specific workflow instance and may route the event to a MESO executor component 1340 corresponding to the specific workflow instance. For example, the first MESO router component 1320*a* may receive a second request indicating an event associated with the communication session (e.g., adding a participant to the communication session) and may route the event to the first MESO executor component 1340*a* for processing.

In some examples, the system 100 may add the participant (e.g., one or more devices associated with the participant) to the communication session as part of establishing the communication session (e.g., prior to establishing an RTP media stream between two endpoints). For example, the MESO executor component 1340*a* may receive one or more events that indicate one or more participants, establish a data path (e.g., RTP media stream) between the devices, and then send/receive data using the data path during the communication session. As used herein, a participant may refer to one or more devices, accounts, user profiles, and/or the like that are associated with an individual contact (e.g., user 5) that is included in the communication session.

In other examples, the system 100 may add the participant to an existing communication session. Thus, the system 100 may use conferencing protocols and/or network components to include the new participant in the communication session. For example, the system 100 may enable three-way calling by mixing two RTP media streams to generate a conference bridge between three endpoints. Additionally or alternatively, the system 100 may enable multi-party calling using network components configured to enable three or more endpoints to participate in the communication session. For example, each endpoint may establish an RTP media stream with a network component and the system 100 may establish an RTP media stream between the network components to add all of the endpoints to a single communication session. However, the disclosure is not limited thereto and in other examples, the system 100 may add the participant to the existing communication session by creating a new communication session that includes all of the participants. Thus, while the system 100 may generate new RTP media stream(s) in order to add the new participant, for ease of explanation the disclosure may refer to the new communication session as a modified communication session or even the existing communication session without departing from the disclosure.

The MESO executor component 1340 may be configured to receive workflow requests and execute the workflow instance. Thus, the MESO component 310 operates under the assumption that an entire workflow should be run on a single workflow instance, as checkpointing and restoring of workflow context is complex and prone to race conditions.

As discussed above, the MESO router component 1320 is responsible for forwarding triggers and events to the MESO executor components 1340. Thus, a request to start a new workflow will flow through the load balancer 1330 and randomly placed on a MESO executor component 1340 that is operational and available (e.g., excess processing capability). When the MESO executor component 1340 acknowledges the request to start a workflow, it will include workflow identification data (e.g., workflowID). The workflow identification data is encoded with information about the running workflow, such as routing information and the like. For example, the workflow identification data may include a fully qualified domain name (FQDN) associated with the running workflow instance (e.g., MESO executor component 1340). The FQDN is a complete domain name for a specific device (e.g., host) and may consist of two parts: a host name and a domain name in a domain name system (DNS). For events raised against the running workflow, the MESO router component 1320 may decode the workflow identification data and extract the routing information in order to route the event to the existing MESO executor component 1340.

Figure 14:
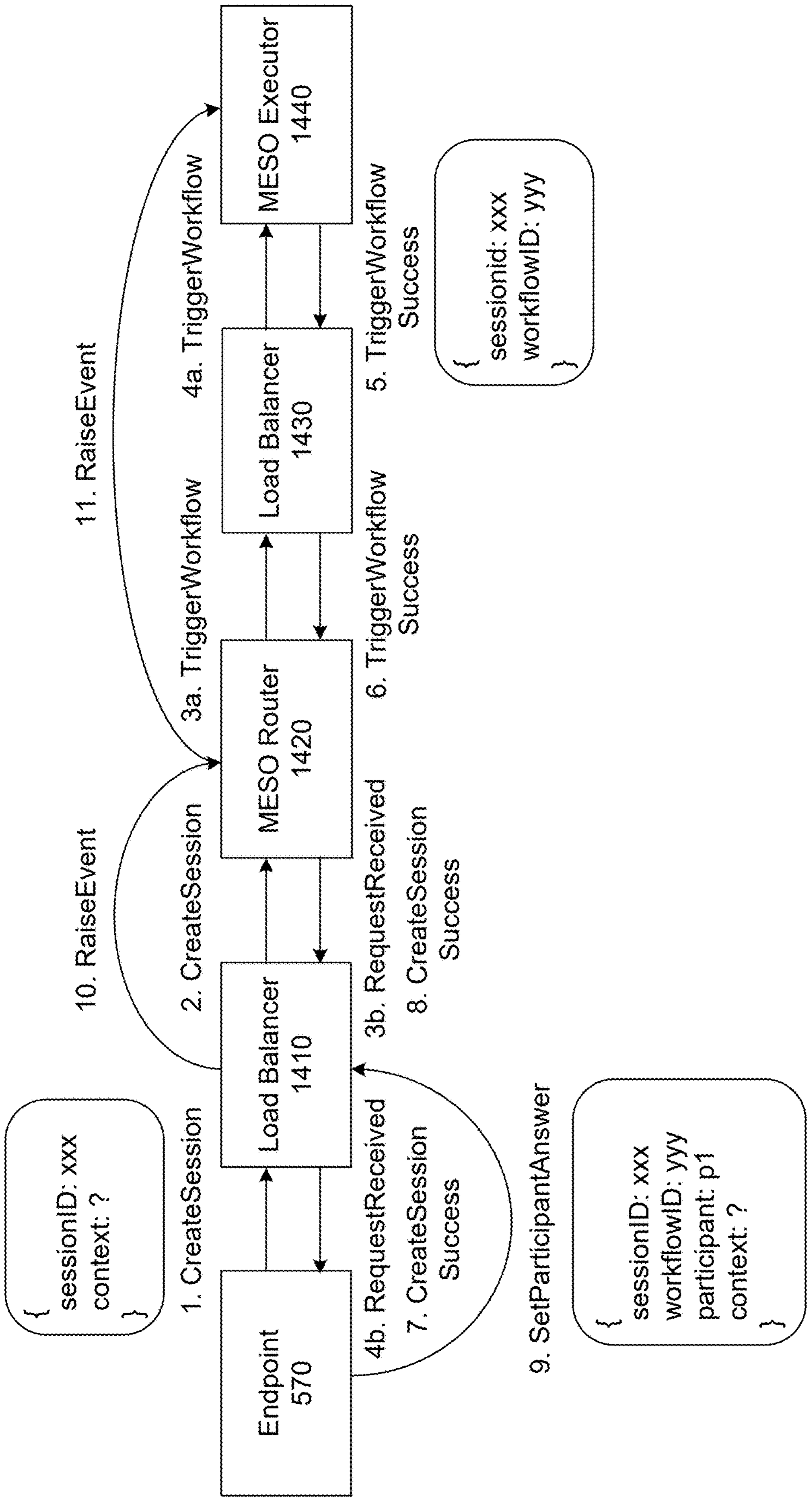
FIG. 14 illustrates an example of routing triggers and events using a media session orchestrator according to embodiments of the present disclosure.

FIG. 14 illustrates an example of routing triggers and events using a media session orchestrator according to embodiments of the present disclosure. As illustrated in FIG. 14, an endpoint 570 may send a request to create a new workflow (e.g., workflow instance) to a first load balancer 1410 (step "1. Create Session") and the first load balancer 1410 may send the request to a MESO router component 1420 (step "2. CreateSession"). The request may indicate a session identification (sessionID: xxx) but not indicate additional context or other information. The MESO router component 1420 may send a trigger to a second load balancer 1430 (step "3*a*. TriggerWorkflow") and the second load balancer 1430 may send the trigger to an available MESO executor component 1440 (step "4*a*. TriggerWorkflow").

As the MESO component 310 operates asynchronously, the MESO router component 1420 may immediately send a response to the first load balancer 1410 (step "3*b*. RequestReceived") and the first load balancer 1410 may send the response to the endpoint 570 (step "4*b*. RequestReceived"). Thus, the endpoint 570 may receive a response from the MESO router component 1420 prior to the MESO executor component 1440 creating the communication session.

As discussed above, the MESO executor component 1440 may be selected randomly from among a plurality of available MESO executor components to start the workflow initially. The MESO executor component 1440 may acknowledge the request by sending a first notification to the second load balancer 1430 (step "5. TriggerWorkflow Success"), which may include the workflow identification data described above. For example, FIG. 14 illustrates the first notification indicating the session identification (sessionID: xxx) and a workflow identification (workflow ID: yyy). The second load balancer 1430 may send the first notification to a MESO router component 1420 (step "6. TriggerWorkflow Success").

The MESO router component 1420 may send a second notification to the first load balancer 1410 to indicate that the communication session is successfully created (step "7. CreateSession Success") and the first load balancer 1410 may send the second notification to the endpoint 570 (step "8. CreateSession Success").

The endpoint 570 may send data corresponding to the existing communication session to the first load balancer 1410 (step "9. SetParticipantAnswer"). For example, the data may indicate the session identification (sessionID: xxx), the workflow identification (workflowID: yyy) and indicate a participant (participant: p 1). The first load balancer 1410 may send the data to a MESO router component 1420 (step "10. RaiseEvent"). The MESO router component 1420 may decode the workflow identification data to identify routing information associated with the particular MESO executor component 1440 and may send the data to the MESO executor component 1440 (step "11. RaiseEvent"). Thus, the MESO router components 1420 may be configured to route events to a corresponding MESO executor component 1440 that is running the workflow instance.

Figure 15:
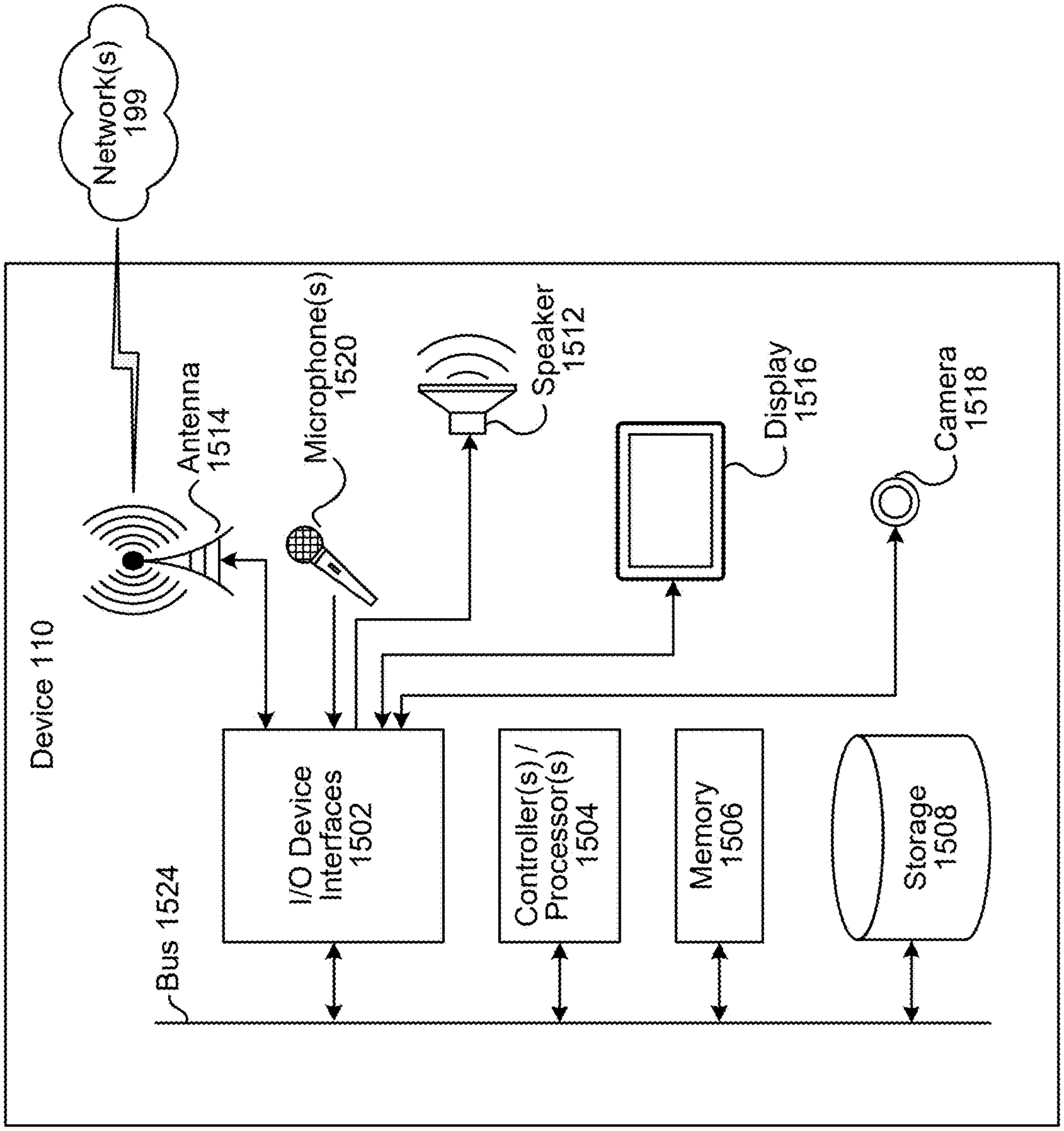
FIG. 15 is a block diagram conceptually illustrating example components of a device according to embodiments of the present disclosure.
Figure 16:
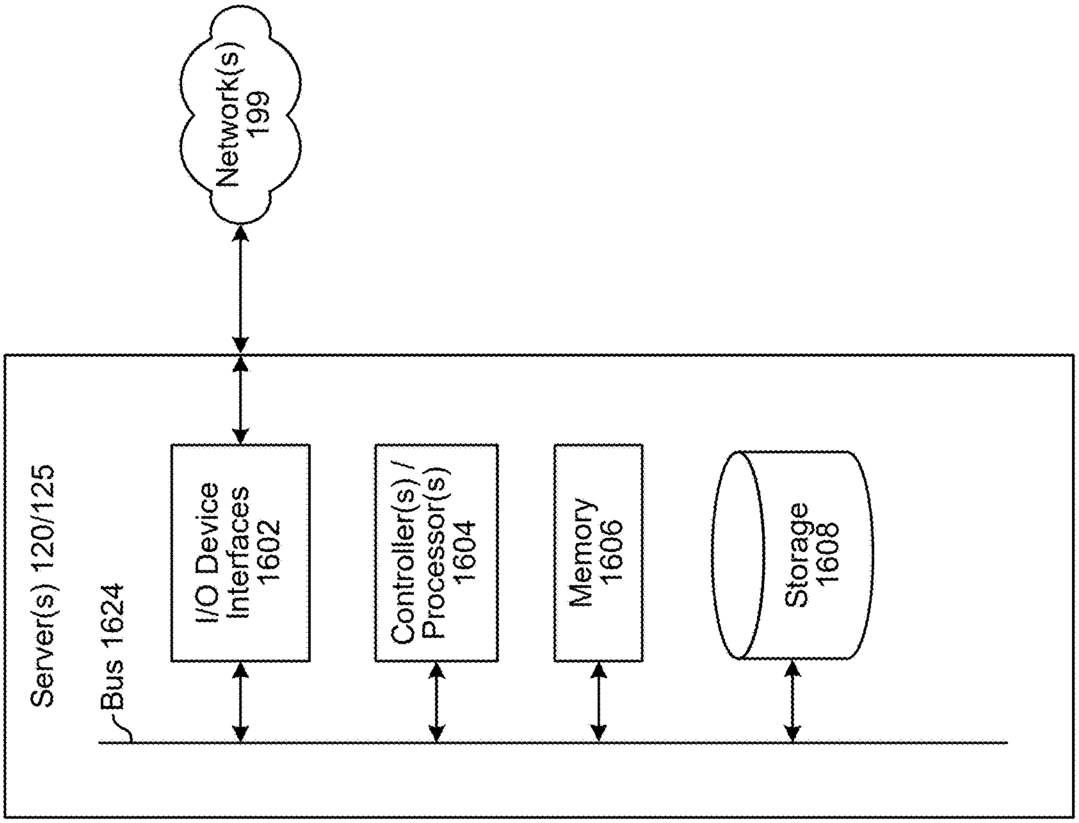
FIG. 16 is a block diagram conceptually illustrating example components of a system according to embodiments of the present disclosure.

FIG. 15 is a block diagram conceptually illustrating a device 110/112 that may be used with the system. FIG. 16 is a block diagram conceptually illustrating example components of the remote system 120/media transport system 125, which may be one or more servers and which may assist with ASR processing, NLU processing, etc. The term "system" as used herein may refer to a traditional system as understood in a system/client computing structure but may also refer to a number of different computing components that may assist with the operations discussed herein. For example, a server may include one or more physical computing components (such as a rack system) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server may be configured to operate using one or more of a client-system model, a computer bureau model, grid computing techniques, fog computing techniques, mainframe techniques, utility computing techniques, a peer-to-peer model, sandbox techniques, or other computing techniques.

Multiple servers may be included in the remote system 120, such as one or more servers for performing ASR processing, one or more servers for performing NLU processing, etc. In operation, each of these server (or groups of devices) may include computer-readable and computer-executable instructions that reside on the respective server, as will be discussed further below.

Each of these devices/systems (110/112/120/125) may include one or more controllers/processors (1504/1604), which may each include a central processing unit (CPU) for processing data and computer-readable instructions, and a memory (1506/1606) for storing data and instructions of the respective device. The memories (1506/1606) may individually include volatile random access memory (RAM), non-volatile read only memory (ROM), non-volatile magnetoresistive memory (MRAM), and/or other types of memory. Each device (110/112/120/125) may also include a data storage component (1508/1608) for storing data and controller/processor-executable instructions. Each data storage component (1508/1608) may individually include one or more non-volatile storage types such as magnetic storage, optical storage, solid-state storage, etc. Each device (110/112/120/125) may also be connected to removable or external non-volatile memory and/or storage (such as a removable memory card, memory key drive, networked storage, etc.) through respective input/output device interfaces (1502/1602).

Computer instructions for operating each device/system (110/112/120/125) and its various components may be executed by the respective device's controller(s)/processor(s) (1504/1604), using the memory (1506/1606) as temporary "working" storage at runtime. A device's computer instructions may be stored in a non-transitory manner in non-volatile memory (1506/1606), storage (1508/1608), or an external device(s). Alternatively, some or all of the executable instructions may be embedded in hardware or firmware on the respective device in addition to or instead of software.

Each device/system (110/112/120/125) includes input/output device interfaces (1502/1602). A variety of components may be connected through the input/output device interfaces (1502/1602), as will be discussed further below. Additionally, each device (110/112/120/125) may include an address/data bus (1524/1624) for conveying data among components of the respective device. Each component within a device (110/112/120/125) may also be directly connected to other components in addition to (or instead of) being connected to other components across the bus (1524/1624).

Referring to FIG. 15, the device 110/112 may include input/output device interfaces 1502 that connect to a variety of components such as an audio output component such as a speaker 1512, a wired headset or a wireless headset (not illustrated), or other component capable of outputting audio. The device 110/112 may also include an audio capture component. The audio capture component may be, for example, a microphone 1520 or array of microphones, a wired headset, or a wireless headset, etc. If an array of microphones is included, approximate distance to a sound's point of origin may be determined by acoustic localization based on time and amplitude differences between sounds captured by different microphones of the array. The device 110 may additionally include a display 1516 for displaying content. The device 110/112 may further include a camera 1518.

Via antenna(s) 1514, the input/output device interfaces 1502 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1502/1602) may also include communication components that allow data to be exchanged between devices such as different physical systems in a collection of systems or other components.

The components of the device(s) 110, the remote system 120, of the media transport system 125 may include their own dedicated processors, memory, and/or storage. Alternatively, one or more of the components of the device(s) 110/112, the remote system 120, or the media transport system 125 may utilize the I/O interfaces (1502/1602), processor(s) (1504/1604), memory (1506/1606), and/or storage (1508/1608) of the device(s) 110/112, the remote system 120, or the media transport system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110/112, the remote system 120, and the media transport system 125, as described herein, are illustrative, and may be located as a stand-alone device or may be included, in whole or in part, as a component of a larger device or system.

Figure 17:
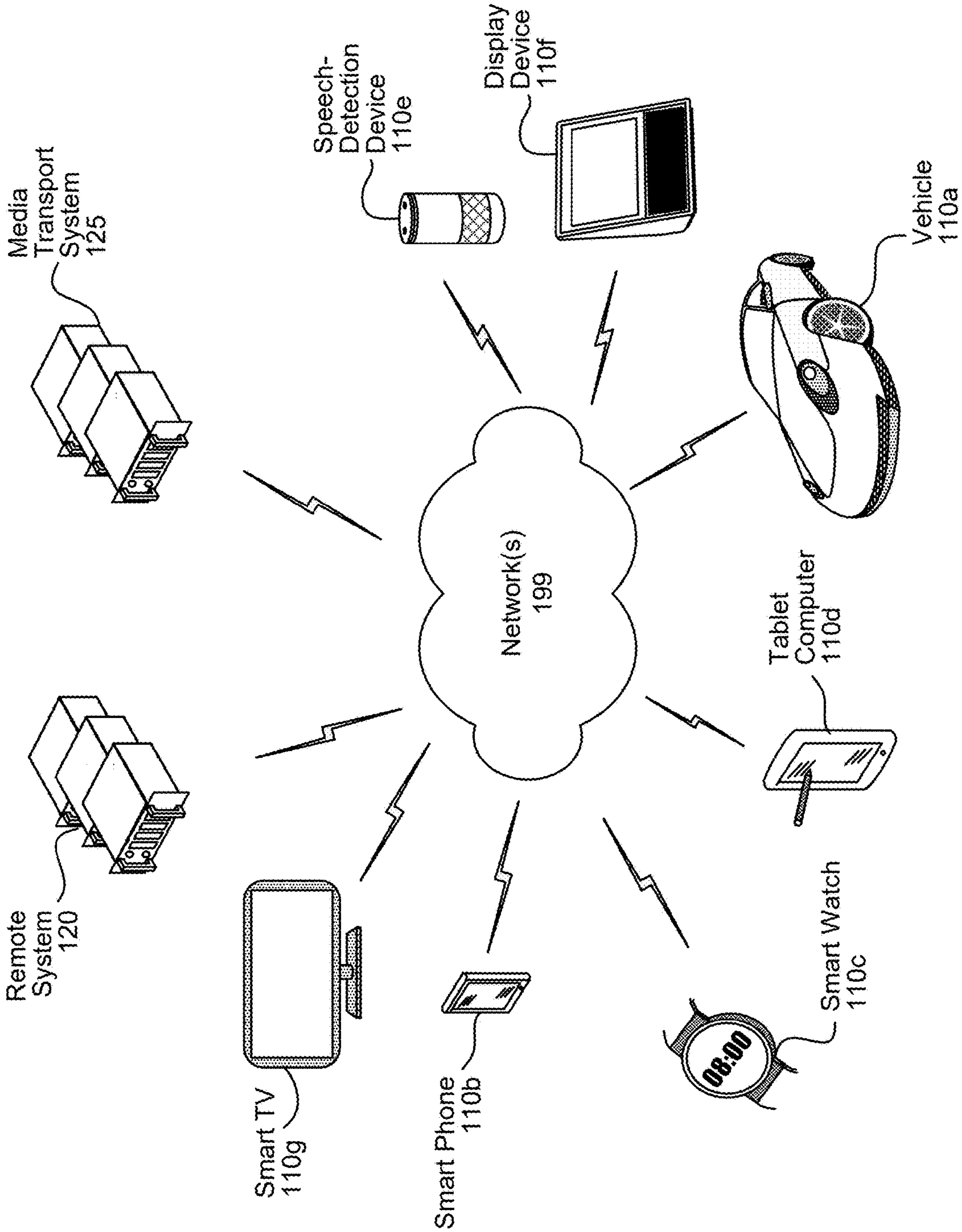
FIG. 17 illustrates an example of a network of devices according to embodiments of the present disclosure.

As illustrated in FIG. 17, multiple devices (110*a*-110*g*, 120, 125) may contain components of the system, and the devices may be connected over a network(s) 199. The network(s) 199 may include a local or private network or may include a wide network such as the Internet. Devices may be connected to the network(s) 199 through either wired or wireless connections. For example, a vehicle 110*a*, a smart phone 110*b*, a smart watch 110*c*, a tablet computer 110*d*, a speech-detection device 110*e*, a display device 110*f*, and/or a smart television 110*g* may be connected to the network(s) 199 through a wireless service provider, over a WiFi or cellular network connection, or the like. Any of the devices 110 may be first devices or second devices 112 depending on the system configuration. Other devices are included as network-connected support devices, such as the remote system 120, the media transport system 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments. The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:

receiving, by one or more media session routing components and from a first device, a first request to initiate a media session with a second device;

selecting, by the one or more media session routing components and from among a plurality of media session execution components that are each capable of initiating the media session, a first media session execution component that is available to initiate the media session;

sending, from the one or more media session routing components to the first media session execution component, a first command that causes the first media session execution component to initiate the media session at least in part by determining and storing media session data that at least (A) causes first media content data output by the second device to be routed to at least one media processing component for processing to generate second media content data different than the first media content data, and (B) causes the second media content data to be routed to the first device;

receiving, from the first media session execution component, at least a first network address of the first media session execution component;

sending, to the first device, a notification that the media session was initiated, the notification including the first network address;

after sending the notification to the first device, receiving, by the one or more media session routing components and from the first device, first event data associated with the media session, the first event data including the first network address; and sending, from the one or more media session routing components to the first media session execution component using the first network address included in the first event data, a second command that causes the first media session execution component to process at least a portion of the first event data using the media session data that has been stored by the first media session execution component since initiation of the media session.

2. The computer-implemented method of claim 1, further comprising, by the first media session execution component:

receiving the first command;

determining an application corresponding to the media session;

sending, to one or more servers associated with the application, a second request for parameters associated with the media session; and receiving, from the one or more servers, second event data that includes the parameters.

3. The computer-implemented method of claim 2, further comprising:

determining, using the parameters, media processing to perform during the media session;

determining that the at least one media processing component is configured to perform the media processing;

determining a second network address of the at least one media processing component; and sending, to the at least one media processing component using the second network address, a third command to perform the media processing.

4. The computer-implemented method of claim 1, further comprising:

determining media processing to perform during the media session;

determining a second network address of the first device;

receiving, from the second device, the first media content data;

performing, using the at least one media processing component, the media processing to the first media content data to generate the second media content data; and sending, to the first device via a network component using the second network address, the second media content data.

5. The computer-implemented method of claim 1, further comprising:
determining to add subtitles during the media session;
determining a second network address of the first device;
receiving, from the second device, the first media content data, the first media content data including first image data and first audio data;
performing, using the at least one media processing component, speech processing on the first audio data to generate text data;
generating, using the at least one media processing component, a graphical element representing the text data;
generating, using the at least one media processing component, second image data using the first image data and the graphical element;
generating, using the at least one media processing component, second media content data that includes the second image data and the first audio data; and
sending, to the first device via a network component using the second network address, the second media content data.

6. The computer-implemented method of claim 1, further comprising, by the first media session execution component:
receiving the first event data;
determining that the first event data corresponds to a second request to add a contact to the media session;
determining call information associated with the contact; and
sending, using the call information, a communication session request indicating that the contact is invited to join the media session.

7. The computer-implemented method of claim 1, further comprising:
receiving the first media content data from the second device;
determining that the at least one media processing component is configured to generate the second media content data using the first media content data;
determining a second network address of the at least one media processing component;
determining a third network address of the second device; and
sending a third command to one or more networking components instructing the one or more networking components to relay the first media content data received from the third network address to the second network address.

8. The computer-implemented method of claim 1, further comprising:
determining a second network address of the at least one media processing component;
determining a third network address of the first device; and
sending a third command to one or more networking components instructing the one or more networking components to relay the second media content data received from the second network address to the third network address.

9. The computer-implemented method of claim 1, wherein the first network address corresponds to a workflow instance that is performing media processing during the media session.

10. The computer-implemented method of claim 1, wherein the first event data corresponds to a second request to modify the media session.

11. The computer-implemented method of claim 1, wherein the first event data corresponds to a second request to add a user profile to the media session.

12. The computer-implemented method of claim 1, further comprising:
receiving, by the one or more media session routing components, second event data associated with a second media session, the second event data including a second network address of a second media session execution component of the plurality of media session execution components; and
sending, from the one or more media session routing components to the second media session execution component using the second network address included in the second event data, at least a portion of the second event data.

13. A system comprising:
at least one processor; and
memory including instructions operable to be executed by the at least one processor to cause the system to:
receive, by one or more media session routing components and from a first device, a first request to initiate a media session with a second device;
select, by the one or more media session routing components and from among a plurality of media session execution components that are each capable of initiating the media session, a first media session execution component that is available to initiate the media session;
send, from the one or more media session routing components to the first media session execution component, a first command that causes the first media session execution component to initiate the media session at least in part by determining and storing media session data that at least (A) causes first media content data output by the second device to be routed to at least one media processing component for processing to generate second media content data different than the first media content data, and (B) causes the second media content data to be routed to the first device;
receive, from the first media session execution component, at least a first network address of the first media session execution component;
send, to the first device, a notification that the media session was initiated, the notification including the first network address;
after sending the notification to the first device, receive, by the one or more media session routing components and from the first device, first event data associated with the media session, the first event data including the first network address; and
send, from the one or more media session routing components to the first media session execution component using the first network address included in the first event data, a second command that causes the first media session execution component to process at least a portion of the first event data using the media session data that has been stored by the first media session execution component since initiation of the media session.

14. The system of claim 13, wherein the memory further comprises instructions that, when executed by the at least one processor, further cause the first media session execution component to:

receive the first command;

determine an application corresponding to the media session;

send, to one or more servers associated with the application, a second request for parameters associated with the media session; and receive, from the one or more servers, second event data that includes the parameters.

15. The system of claim 14, wherein the memory further comprises instructions that, when executed by the at least one processor, further cause the system to:

determine, using the parameters, media processing to perform during the media session;

determine that the at least one media processing component is configured to perform the media processing;

determine a second network address of the at least one media processing component; and send, to the at least one media processing component using the second network address, a third command to perform the media processing.

16. The system of claim 13, wherein the memory further comprises instructions that, when executed by the at least one processor, further cause the system to:

determine media processing to perform during the media session;

determine a second network address of the first device;

receive, from the second device, the first media content data;

perform, using the at least one media processing component, the media processing to the first media content data to generate the second media content data; and send, to the first device via a network component using the second network address, the second media content data.

17. The system of claim 13, wherein the memory further comprises instructions that, when executed by the at least one processor, further cause the system to:

determine to add subtitles during the media session;

determine a second network address of the first device;

receive, from the second device, the first media content data, the first media content data including first image data and first audio data;

perform, using the at least one media processing component, speech processing on the first audio data to generate text data;

generate, using the at least one media processing component, a graphical element representing the text data;

generate, using the at least one media processing component, second image data using the first image data and the graphical element;

generate, using the at least one media processing component, second media content data that includes the second image data and the first audio data; and send, to the first device via a network component using the second network address, the second media content data.

18. The system of claim 13, wherein the memory further comprises instructions that, when executed by the at least one processor, further cause the first media session execution component to:

receive the first event data;

determine that the first event data corresponds to a second request to add a contact to the media session;

determine call information associated with the contact; and send, using the call information, a communication session request indicating that the contact is invited to join the media session.

19. The system of claim 13, wherein the memory further comprises instructions that, when executed by the at least one processor, further cause the system to:

receive the first media content data from the second device;

determine that the at least one media processing component is configured to generate the second media content data using the first media content data;

determine a second network address of the at least one media processing component;

determine a third network address of the second device; and send a third command to one or more networking components instructing the one or more networking components to relay the second media content data received from the third network address to the second network address.

20. The system of claim 13, wherein the memory further comprises instructions that, when executed by the at least one processor, further cause the system to:

determine a second network address of the at least one media processing component;

determine a third network address of the first device; and send a third command to one or more networking components instructing the one or more networking components to relay the second media content data received from the second network address to the third network address.

* * * * *